United States Patent
Suzuki et al.

(10) Patent No.: US 9,021,217 B2
(45) Date of Patent: Apr. 28, 2015

(54) COMMUNICATION APPARATUS, LOAD DISTRIBUTION METHOD, AND RECORDING MEDIUM

(71) Applicant: Fujitsu Limited, Kawasaki-shi, Kanagawa (JP)

(72) Inventors: Takahisa Suzuki, Kawasaki (JP);
Koichiro Yamashita, Hachioji (JP);
Hiromasa Yamauchi, Kawasaki (JP);
Koji Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 13/889,109

(22) Filed: May 7, 2013

(65) Prior Publication Data

US 2013/0246715 A1    Sep. 19, 2013

Related U.S. Application Data

(63) Continuation of application No. PCT/JP2010/070365, filed on Nov. 16, 2010.

(51) Int. Cl.
*G06F 12/00* (2006.01)
*G06F 12/02* (2006.01)
*H04L 1/08* (2006.01)
*H04L 1/20* (2006.01)
(Continued)

(52) U.S. Cl.
CPC ............ *G06F 12/0284* (2013.01); *G06F 12/00* (2013.01); *H04L 1/08* (2013.01); *H04L 1/20* (2013.01); *H04W 28/0205* (2013.01); *H04W 28/0236* (2013.01); *H04L 1/189* (2013.01); *H04L 1/1825* (2013.01); *H04L 1/1887* (2013.01)

(58) Field of Classification Search
None
See application file for complete search history.

(56) References Cited

U.S. PATENT DOCUMENTS 5,692,192 A    11/1997  Sudo
5,884,077 A     3/1999  Suzuki
(Continued)

FOREIGN PATENT DOCUMENTS

| JP | 7-152699 A | 6/1995 |
| JP | 8-30472 A  | 2/1996 |
| JP | 8-77026 A  | 3/1996 |

(Continued)

OTHER PUBLICATIONS

Distributed Shared Memory-Wikipedia [online], retrieved on Oct. 7, 2010, Internet <URL: http:// ja.wikipedia.org/wik%E5%88%86%E6%095%A3%E5%85%B1%E6%9C%89%E3%83%A1%E3%83% A2%E3%83%AA>, 3 pages.

(Continued)

*Primary Examiner* — Shawn X Gu
(74) *Attorney, Agent, or Firm* — Arent Fox LLP

(57) ABSTRACT

A first communication apparatus includes a first central processing core; and a first memory. The first communication apparatus executes load distribution based on a first load amount of the first communication apparatus and a second load amount of a second communication apparatus that includes a second central processing core and a second memory. The first communication apparatus executes first load distribution when the first communication apparatus and the second communication apparatus perform wireless communication. The first communication apparatus executes second load distribution when the first communication apparatus and the second communication apparatus perform wired communication.

10 Claims, 27 Drawing Sheets

(51) Int. Cl.
   *H04W 28/02*   (2009.01)
   *H04L 1/18*    (2006.01)

(56)                References Cited

U.S. PATENT DOCUMENTS

2008/0168465 A1    7/2008   Tanaka
2009/0216974 A1    8/2009   Morishima et al.

FOREIGN PATENT DOCUMENTS

JP         2003-58520  A      2/2003
JP         2005-346327 A     12/2005
JP         2008-152470 A      7/2008
JP         2008-191949 A      8/2008
JP         2009-199414 A      9/2009

OTHER PUBLICATIONS

"Numa: Theory and Practice—SourceForge. JP Magazine: Full of Topics about Open Source" [online], retrieved on Oct. 7, 2010, Internet <URL: http://sourceforge.jp/magazine/03/05/14/0222221>, 8 pages.

"Numa: Wikipedia" [online], retrieved on Oct. 7, 2010, Internet <URL: http://ja.wikipedia.org/wiki/NUMA>, 4 pages.

International Search Report issued in PCT/JP2010/070365, mailed Jan. 25, 2011, 4 pages.

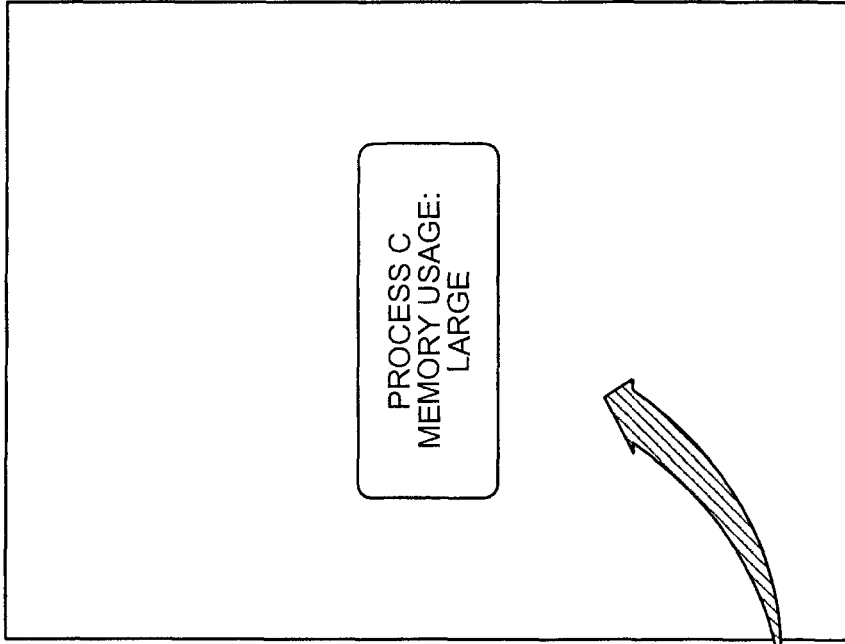
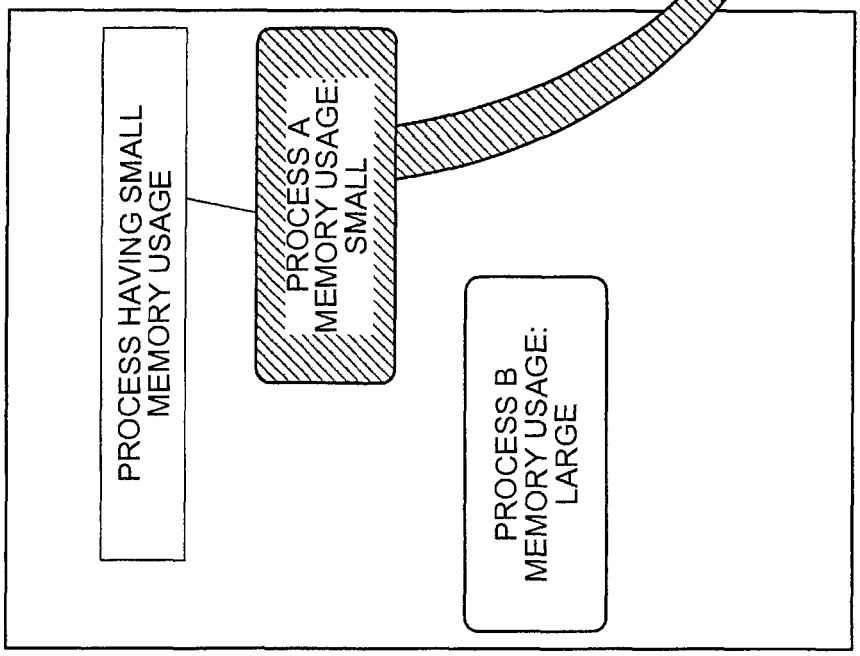
FIG.5

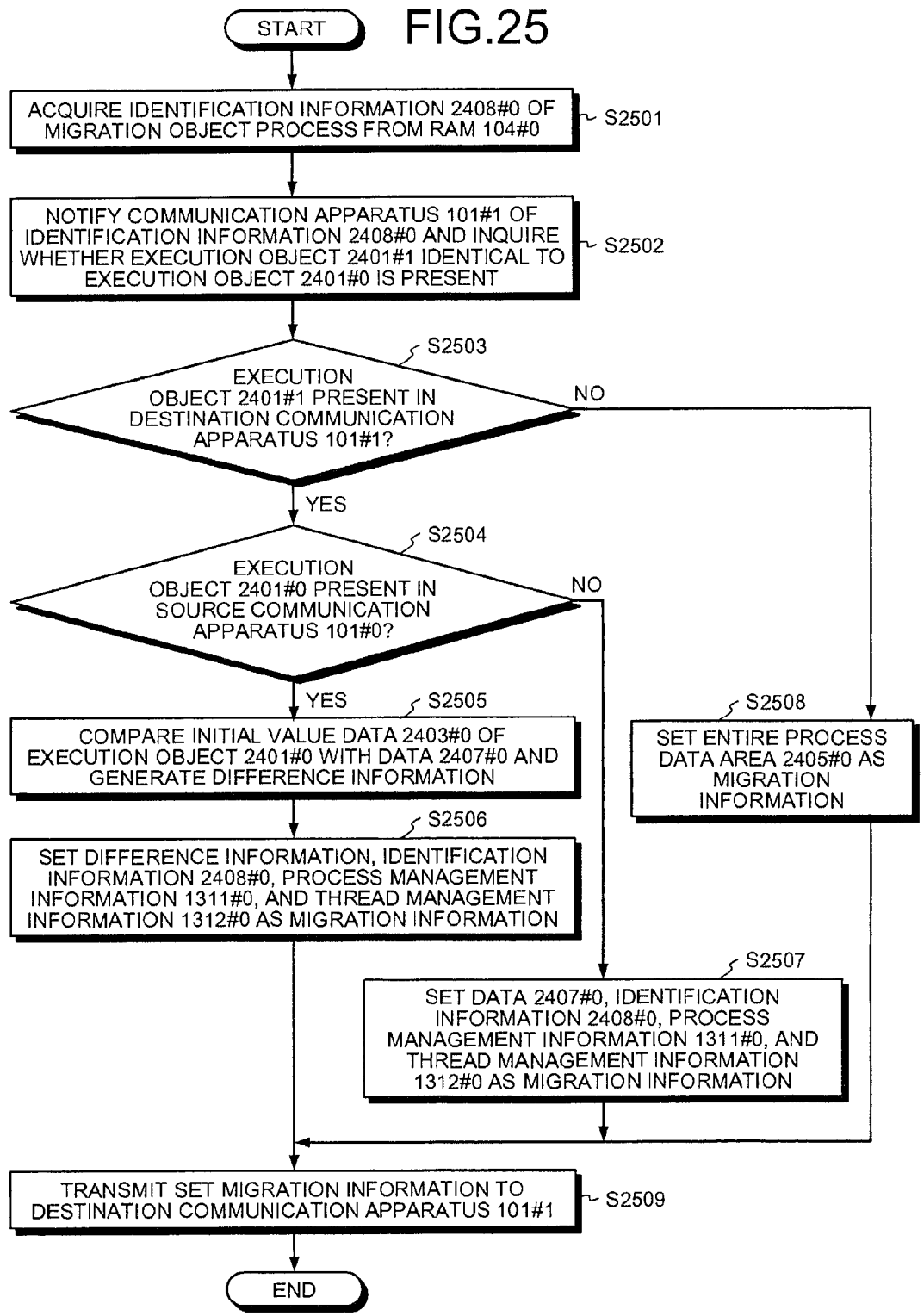

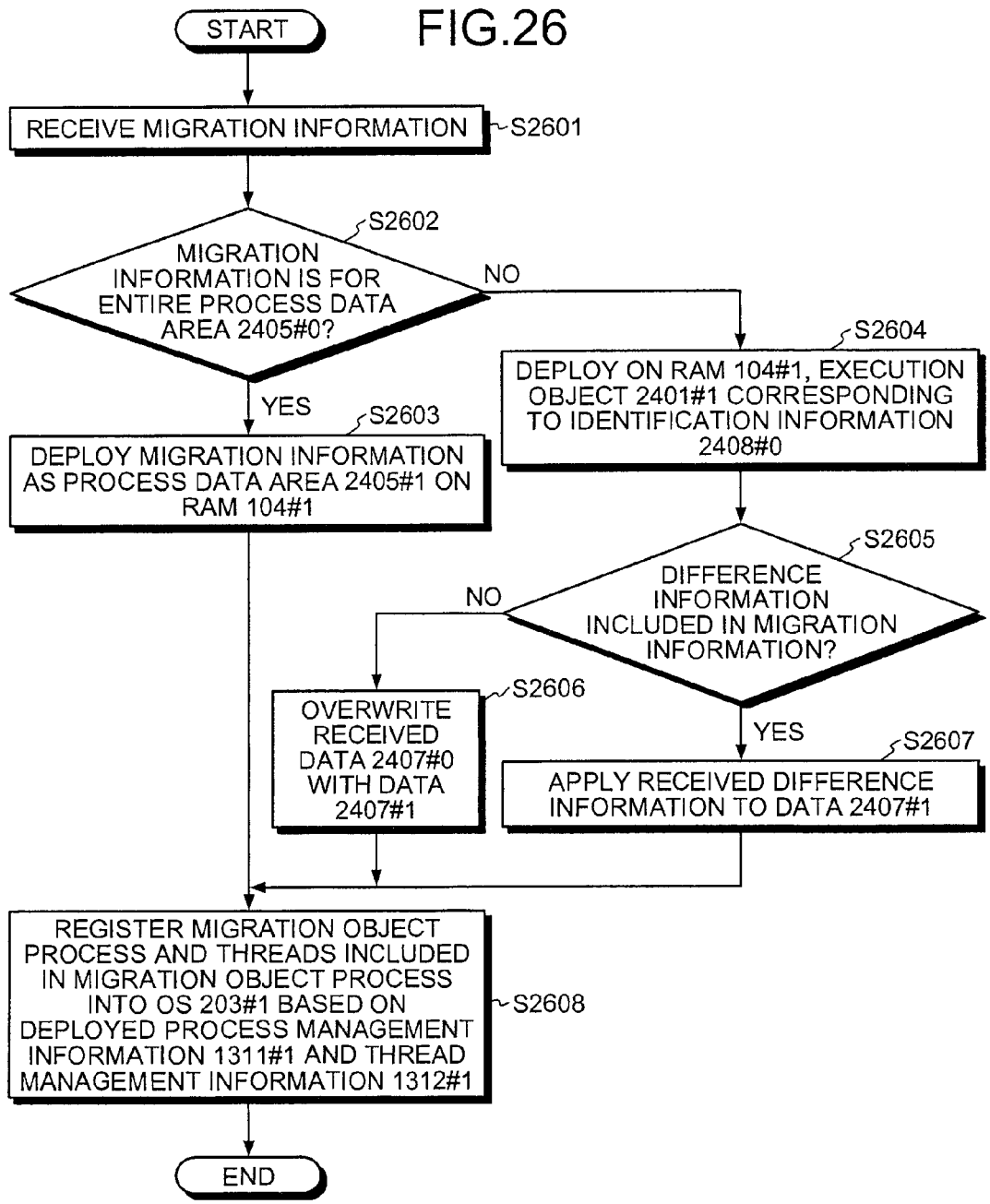

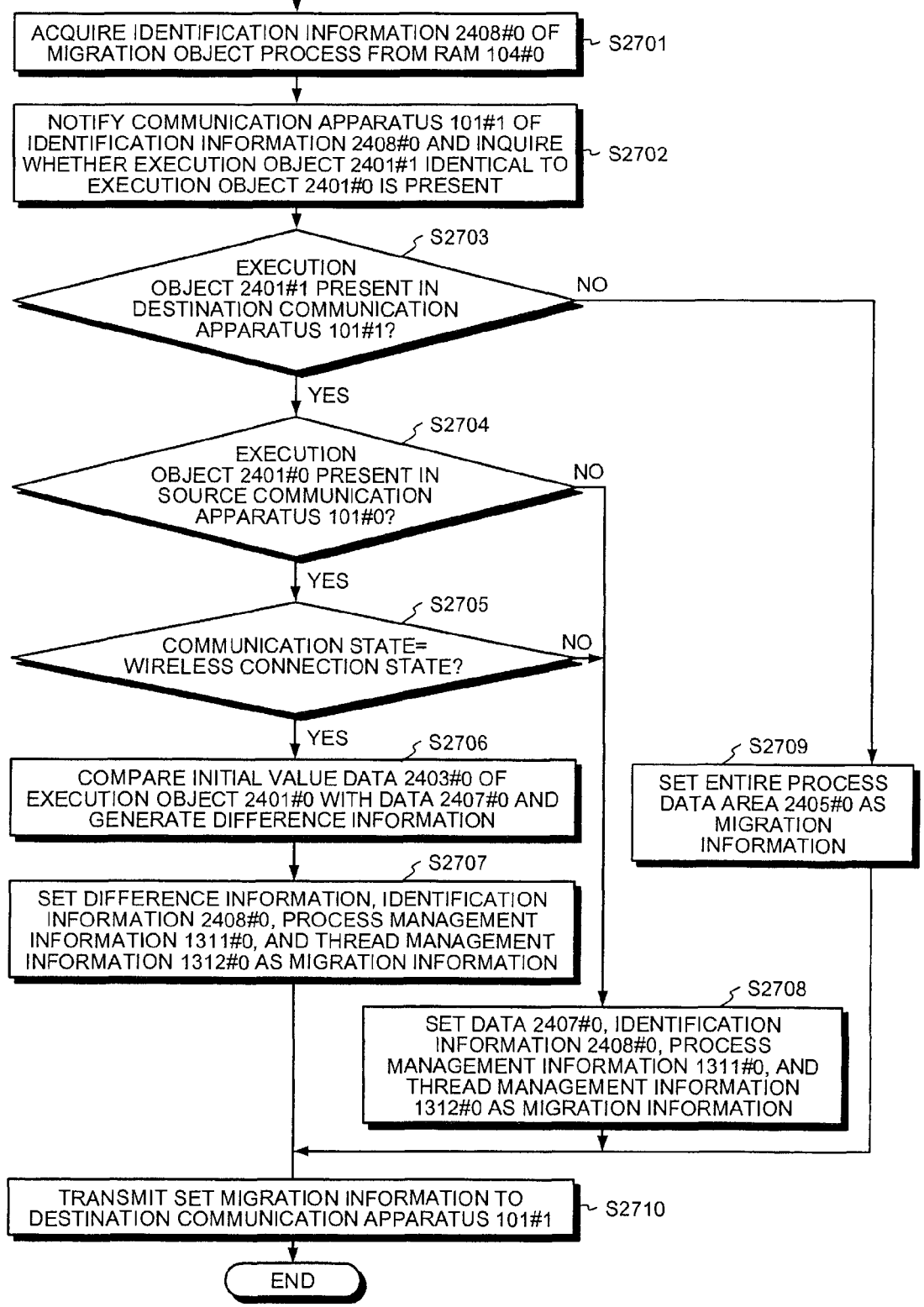

COMMUNICATION APPARATUS, LOAD DISTRIBUTION METHOD, AND RECORDING MEDIUM

CROSS REFERENCE TO RELATED APPLICATIONS

This application is a continuation application of International Application PCT/JP2010/070365, filed on Nov. 16, 2010 and designating the U.S., the entire contents of which are incorporated herein by reference.

FIELD

The embodiments discussed herein are related to a communication apparatus, a load distribution method, and a recording medium.

BACKGROUND

Multicore processor systems including multiple processing cores equipped with a central processing unit (CPU) and memory can roughly be classified into two types. One type is a distributed memory-type in which a CPU cannot directly refer to the memory of another processing core and the other type is a distributed shared memory-type or non-uniform memory access (NUMA) type in which a CPU can refer to the memory of another processing core (see, e.g., "Distributed Shared Memory—Wikipedia" [online], retrieved on Oct. 7, 2010, Internet <URL: http://ja.wikipedia.org/wiki/%E5%88%86%E6%95%A3%E5%85%B1%E6%9C%89%E3%83%A1%E3%83%A2%E3%83%AA>, "NUMA—Wikipedia" [online], retrieved on Oct. 7, 2010, Internet <URL: http://ja.wikipedia.org/wiki/NUMA>, and "NUMA—Theory and Practice—SourceForge. JP Magazine: Full of Topics about Open Source" [online], retrieved on Oct. 7, 2010, Internet <URL: http://sourceforge.jp/magazine/03/05/14/0222221> for description of the distributed shared memory-type and the NUMA-type).

Multicore processor systems of the distributed memory-type, the distributed shared memory-type, and the NUMA-type are applied in cases such as when a sufficient communication bandwidth cannot be acquired in a large-scale computer for implementing shared memory such as memory between housings. The multicore processor systems of the distributed memory-type, the distributed shared memory-type, and the NUMA-type are used when excessive congestion due to shared memory reduces the performance of a large-scale computer consequent to a very large number of CPUs being disposed.

When load is distributed among processing cores, a process is migrated between the processing cores by a communication system to which a processing group belongs. In a multicore processor system of the distributed shared memory-type or the NUMA-type, the memory of one processing core and the memory of another processing core have different access speeds while the memories are logically handled to be equivalent in the shared memory-type multicore processor system. Therefore, a method of migrating a process in the distributed shared memory-type or the NUMA-type multicore processor system can be implemented by utilizing a method equivalent to that of the shared memory-type multicore processor system.

On the other hand, with regard to load distribution in a multicore processor system of the distributed memory-type, for example, a technique is disclosed that migrates from a source processing core to a destination processing core by utilizing a communication path between the processing cores, data utilized by a process that is to be migrated (see, e.g., Japanese Laid-Open Patent Publication No. 2009-199414). For example, in a technique according to Japanese Laid-Open Patent Publication No. 2009-199414, after migration of a given process, when a destination processing core executes the given process, the destination processing core accesses the memory of the source processing core, thereby enabling a multicore processor system of the distributed memory-type to implement migration of a process between processing cores and to execute load distribution.

For a technique applicable to a method of selecting a process among multiple processes in the load distribution, a technique is disclosed that calculates cost based on memory capacity and a transfer time at the time of thread switching to make the switch to a thread having the smallest cost (see, e.g., Japanese Laid-Open Patent Publication No. 2008-152470). As a result, a process having the smallest cost can be migrated at the time of load distribution.

A technique is disclosed that regularly monitors load statuses of multiple processing cores to execute load distribution when load amounts are significantly biased between processing cores in a method of determining whether the load distribution is to be executed (see, e.g., Japanese Laid-Open Patent Publication No. 2008-191949).

Recently, a separate-type mobile telephone exists that is configured to be used in such a manner that two communication apparatuses are coupled or that two communication apparatuses are separated to make a phone call with one communication apparatus and connect to a network with the other communication apparatus. If each of the communication apparatuses has a CPU and memory, such a separate-type mobile telephone can be considered as one form of a distributed memory-type, or distributed shared memory-type, or NUMA-type multicore processor system.

In a large-scale computer to which the distributed memory-type, the distributed shared memory-type, or the NUMA-type multicore processor system is applied, a communication path is supposed to be fixed. Therefore, for example, the technique according to Japanese Laid-Open Patent Publication No. 2009-199414 is directed to a migration method of a process in the case of a fixed communication path. However, the communication speed of the separate-type mobile telephone varies considerably depending on whether the communication apparatuses are coupled or separated and, even when the load distribution is executed, migration of a process causes a high load depending on the communication state and processing efficiency problematically deteriorates.

For example, when communication apparatuses are separated and information is communicated in a wireless connection state in a separate-type mobile telephone, if the load distribution is executed based on the scheme of the distributed shared memory-type or the NUMA-type, a problem arises in that communication takes time because communication between communication apparatuses is frequently performed in the low-speed wireless connection state.

SUMMARY

According to an aspect of an embodiment, a first communication apparatus includes a first central processing core; and a first memory. The first communication apparatus executes load distribution based on a first load amount of the first communication apparatus and a second load amount of a second communication apparatus that includes a second central processing core and a second memory. The first communication apparatus executes first load distribution when the first communication apparatus and the second communication apparatus perform wireless communication. The first communication apparatus executes second load distribution when the first communication apparatus and the second communication apparatus perform wired communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram of operation of load distribution when the communication state is a wireless connection state;

FIG. 25 is a flowchart of a migration source process of a process migrating unit 404 in a source communication apparatus 101#0 in the second embodiment;

FIG. 26 is a flowchart of a migration destination process of the process migrating unit 404 in a destination communication apparatus 101#1 according to the second embodiment; and FIG. 27 is a flowchart of the migration source process of the process migrating unit 404 in the source communication apparatus 101#0 according to a third embodiment.

DESCRIPTION OF EMBODIMENTS

Preferred embodiments of the present invention will be explained with reference to the accompanying drawings.

Figure 1:
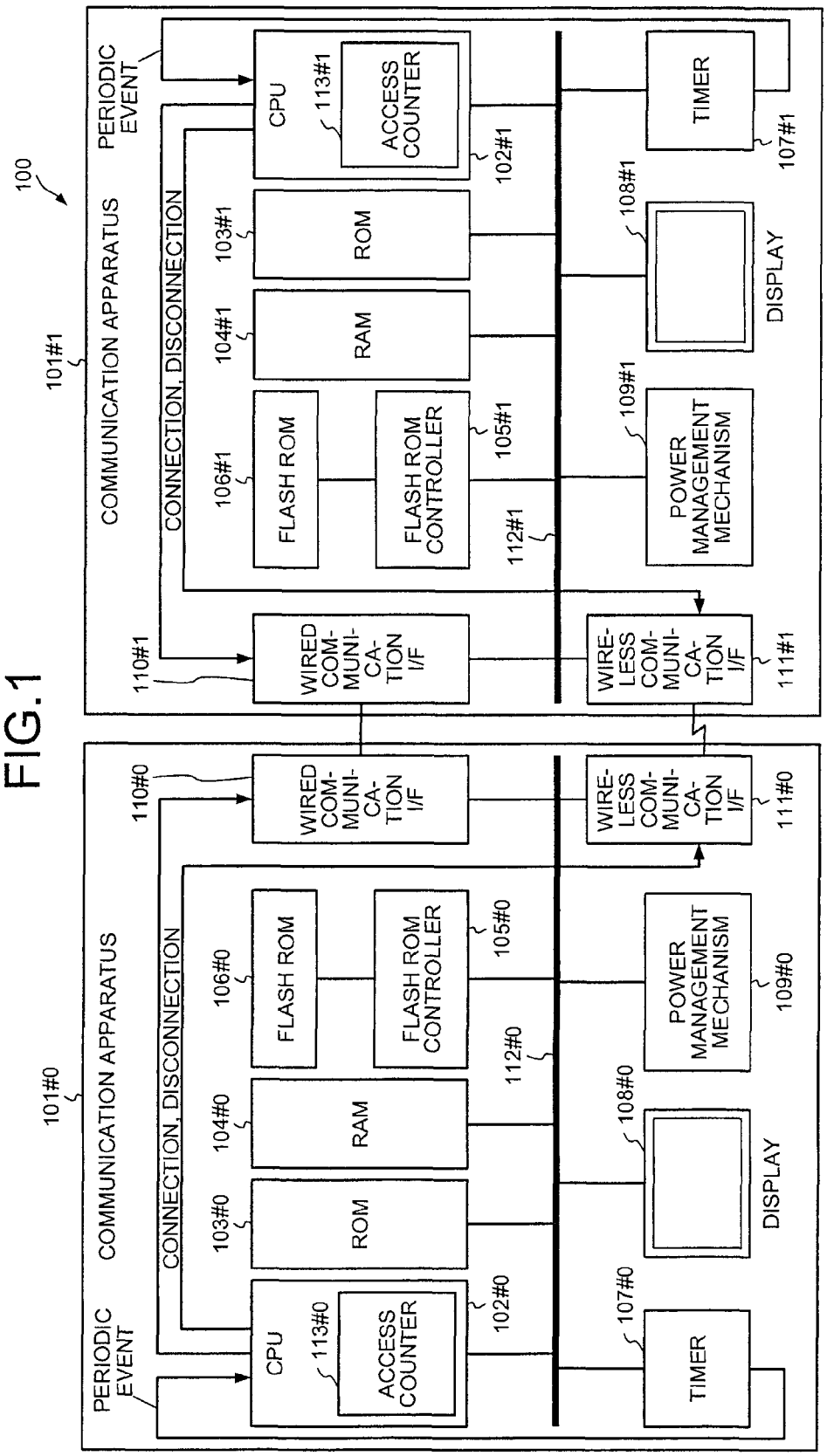
FIG. 1 is a block diagram of a hardware configuration of a communication system 100 according to a first embodiment.

FIG. 1 is a block diagram of a hardware configuration of a communication system 100 according to a first embodiment. In FIG. 1, the communication system 100 includes a communication apparatus 101#0 and a communication apparatus 101#1. The communication system 100 may include three or more communication apparatuses 101. A suffix "#0" will hereinafter indicate hardware or software included in the communication apparatus 101#0 and a suffix "#1" will indicate hardware or software included in the communication apparatus 101#1.

For example, the communication system 100 is a separate-type mobile terminal handling the communication apparatus 101#0 and the communication apparatus 101#1 as one terminal. A user can use the communication apparatus 101#0 and the communication apparatus 101#1 in a coupled manner or can release the coupling and use the communication apparatus 101#0 and the communication apparatus 101#1 in a separated manner. Although hardware of the communication apparatus 101#0 will be described hereinafter, the communication apparatus 101#1 includes the same hardware as the communication apparatus 101#0.

The communication apparatus 101#0 includes a CPU 102#0 as a central processing device, read only memory (ROM) 103#0, and random access memory (RAM) 104#0. The communication apparatus 101#0 also includes a flash ROM controller 105#0, flash ROM 106#0, a timer 107#0, a display 108#0, a power management mechanism 109#0, a wired communication I/F 110#0, and a wireless communication I/F 111#0. The units are connected through a bus 112#0, respectively.

The CPU 102#0 is responsible for overall control of the communication apparatus 101#0. The CPU 102#0 has an access counter 113#0 measuring the number of memory accesses by a program in operation. The memory refers to the ROM 103#0, the RAM 104#0, the flash ROM 106#0, etc. The ROM 103#0 stores execution objects such as a boot program and applications. The RAM 104#0 is used as a work area of the CPU 102#0.

The flash ROM controller 105#0 controls the reading and writing of data with respect to the flash ROM 106#0 under the control of the CPU 102#0. The flash ROM 106#0 is a recording medium storing data written under the control of the flash ROM controller 105#0. Examples of data include image data and video data acquired through the wired communication I/F 110#0 and the wireless communication I/F 111#0 by a user of the communication system 100, and a program for load distribution setting according to this embodiment may be stored. For example, a memory card and an SD card may be employed as the flash ROM 106#0.

The timer 107#0 has a function of regularly notifying the CPU 102#0. For example, the timer 107#0 counts clocks and notifies the CPU 102#0 of an interrupt signal when the number of counts reaches a specified value.

The display 108#0 displays a cursor, icons, and tool boxes as well as data such as documents, images, and functional information. For example, a TFT liquid crystal display is employable as the display 108#0. The display 108#0 may be a touch panel manipulated by a user. Configuration may be such that the display 108 is included in any one of the communication apparatuses 101#0 and 101#1. The communication apparatus 101 without the display 108 may have a keyboard for inputting numeric characters, various instructions, etc., by the user.

The power management mechanism 109#0 monitors the remaining battery capacity of the communication apparatus 101#0 and controls the frequency of a clock supplied to the CPU 102#0, etc. The wired communication I/F 110#0 and the wireless communication I/F 111#0 are connected with the communication apparatus 101#1 through a communication line. The wired communication I/F 110#0 is connected with the wired communication I/F 110#1 through a wired line and the wireless communication I/F 111#0 is connected with the wireless communication I/F 111#1 through a wireless line. For example, a connection through a universal serial bus (USB) terminal is employable for the wired connection and the connection conforming to standards such as IEEE 802.15 and IEEE 802.11 is employable for the wireless connection Although the wireless communication I/F 111#0 directly communicates with the wireless communication I/F 111#1 through ad-hoc communication, the wireless communication I/F 111#0 may be connected to a network such as the Internet, via a wireless LAN. The wired line of the wired communication I/F 110#0 and the wired communication I/F 110#1 can be disconnected by releasing the coupling between the communication apparatus 101#0 and the communication apparatus 101#1. Hereinafter, a communication state of performing communication through a wireless line while a wired line is disconnected will be referred to as a wireless connection state, and a communication state of performing communication through a wired line will be referred to as a wired connection state.

Figure 2A:
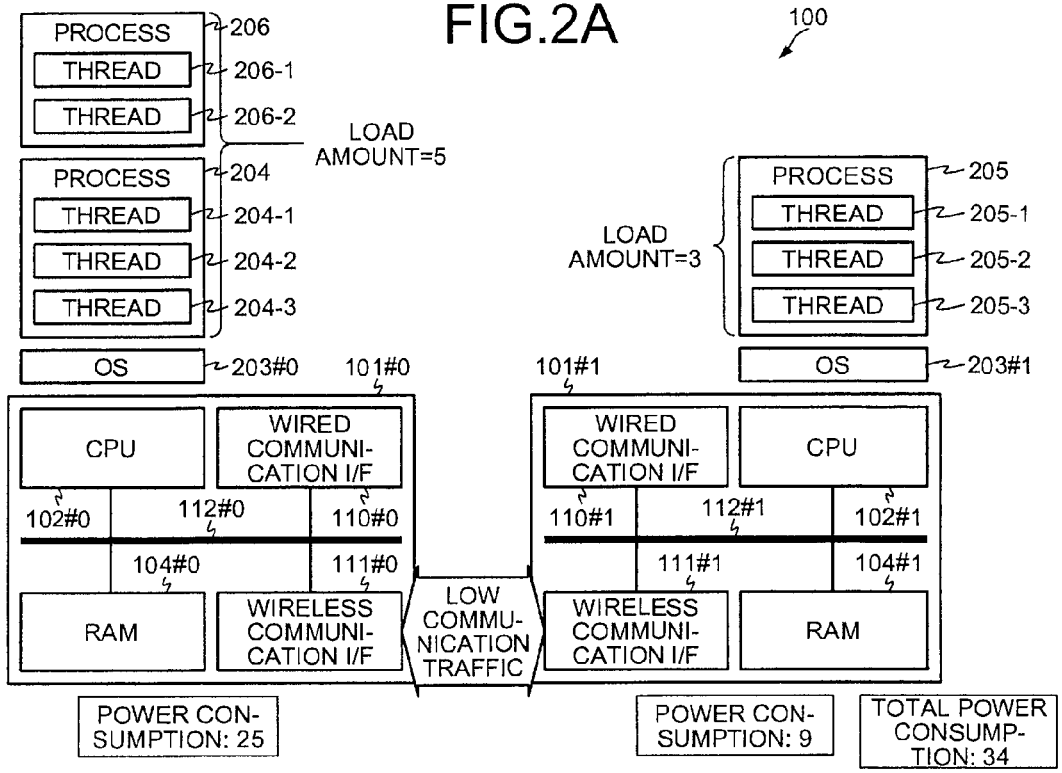
FIGS. 2A and 2B are explanatory views of software load distribution states corresponding to communication states of the communication system 100.
Figure 2B:
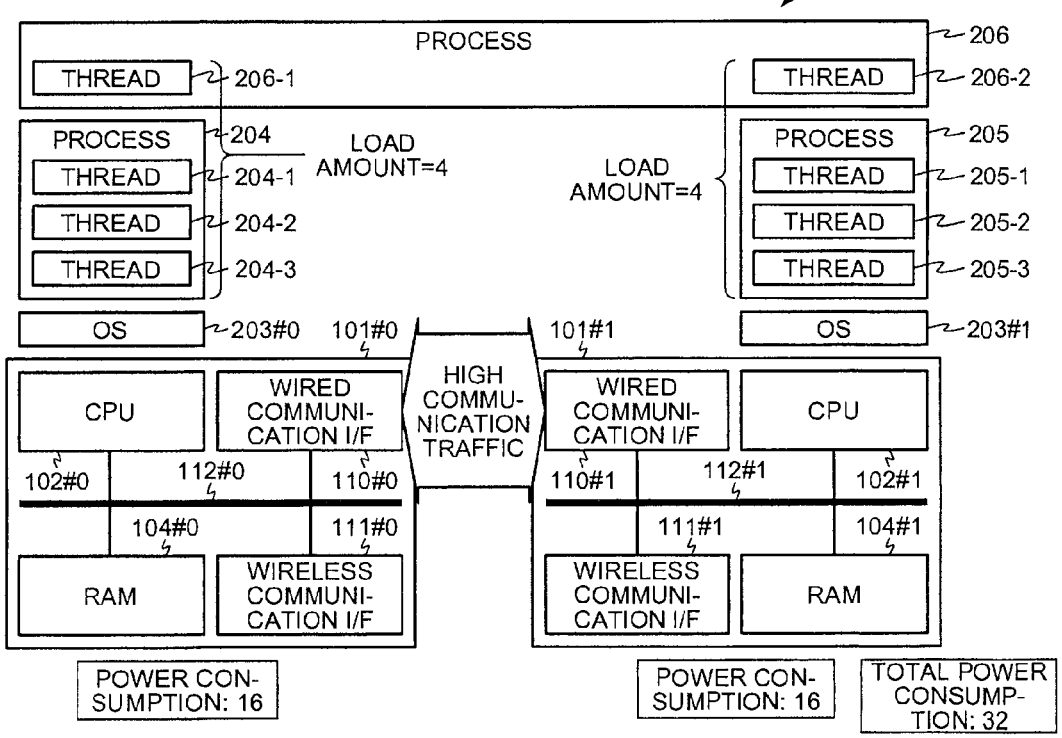

FIGS. 2A and 2B are explanatory views of software load distribution states corresponding to communication states of the communication system 100. FIG. 2A depicts the communication system 100 when the communication state is the wireless connection state and FIG. 2B depicts the communication system 100 when the communication state is the wired connection state. The communication apparatus 101#0 executes an OS 203#0 and the communication apparatus 101#1 executes an OS 203#1. The OS 203#0 and the OS 203#1 are software controlling the communication apparatus 101#0 and the communication apparatus 101#1, respectively. A process 204, a process 205, and a process 206 are allocated to the CPU 102#0 and the CPU 102#1 by functions of the OS 203#0 and the OS 203#0.

The processes 204 to 206 include threads. A thread is a base unit for managing processing executed by a CPU and a process is a unit of management of a memory and of a device utilized by threads. In an example of the processes 204 to 206, the process 204 includes three threads, i.e., threads 204-1 to 204-3. Similarly, the process 205 includes three threads, i.e., threads 205-1 to 205-3. The process 206 includes two threads, i.e., threads 206-1 and 206-2.

For simplicity of description, the threads in FIGS. 2A and 2B each have equivalent load amounts and the load amount of one thread is defined as 1 in this description. It is assumed that the CPU 102#0 and the CPU 102#1 execute a given load amount at an executable frequency. Since power consumption increases at an accelerated rate according to the frequency, power consumption of a CPU is set to a value acquired by squaring a total load amount of threads executed by the CPU in the description of FIGS. 2A and 2B.

In FIG. 2A, the communication state is the wireless connection state and load distribution is performed based on process. The load distribution based on process will hereinafter be referred to as first load distribution. Data is rarely shared between processes. Therefore, communication traffic is smaller in the first load distribution. Because of the execution of the threads 204-1 to 204-3, the thread 206-1, and the thread 206-2, the CPU 102#0 has a load amount=5 as a specific load amount. Because of the execution of the threads 205-1 to 205-3, the CPU 102#1 has a load amount=3. Therefore, the CPU 102#0 and the CPU 102#1 have power consumption=25 and power consumption=9, respectively, and the power consumption=25+9=34 of the communication system 100 is obtained at the time of the first load distribution.

The load amount and the power consumption of the CPU 102#0 and the CPU 102#1 will be described for a case when the communication apparatus 101#0 and the communication apparatus 101#1 are coupled and the communication state shifts from wireless communication to wired communication.

In FIG. 2B, the communication state is the wired connection state and load distribution is performed based on thread. The load distribution based on thread will hereinafter be referred to as second load distribution. Since threads have finer granularity than processes, the second load distribution can make load amounts of the communication apparatuses 101 closer to being equivalent. Data is often shared between threads. Therefore, communication traffic is greater in the second load distribution as compared to the communication traffic of the first load distribution. Although the communication traffic of the second load distribution becomes greater as described above, since wired communication is performed at a faster communication speed of about 10 times that of wireless communication, efficient load distribution can be executed regardless of larger communication traffic.

Because of the execution of the threads 204-1 to 204-3 and the thread 206-1, the CPU 102#0 has a load amount=4 as a specific load amount. Because of the execution of the threads 205-1 to 205-3 and the thread 206-2, the CPU 102#1 has a load amount=4. Therefore, the CPU 102#0 and the CPU 102#1 have power consumption=16 and power consumption=16, respectively, and the power consumption=16+16=32 of the communication system 100 is obtained at the time of the second load distribution. As described above, the second load distribution having finer granularity can reduce power consumption as compared to the first load distribution.

The communication system 100 according to the first embodiment implements efficient load distribution according to the communication state with consideration of significant variation of the communication speed between the communication apparatuses 101 depending on the communication state.

Figure 3:
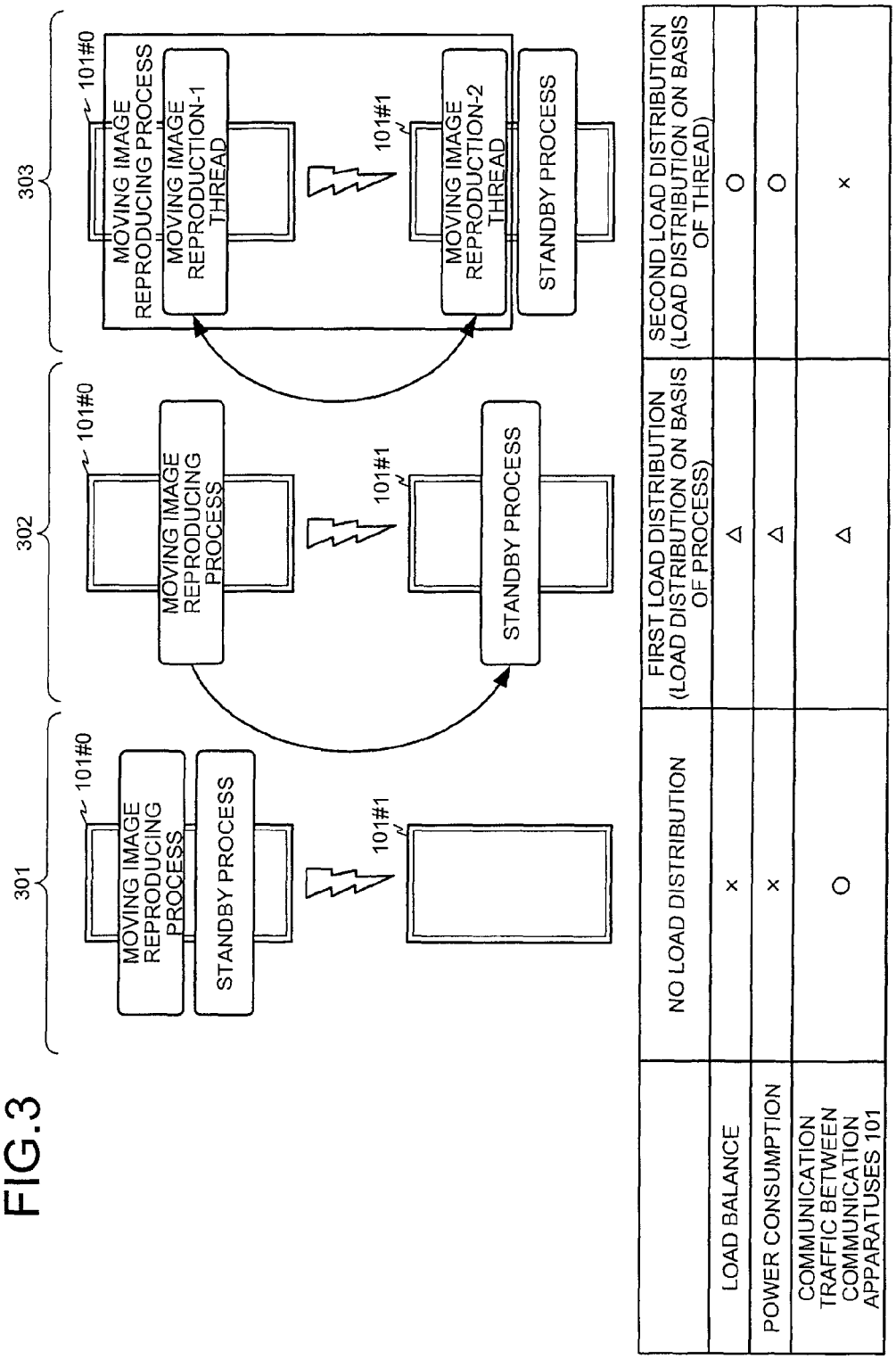
FIG. 3 is an explanatory view of a specific example of load distribution.

FIG. 3 is an explanatory view of a specific example of the load distribution. While the execution state of the communication system 100 in the first load distribution and the second load distribution is described with reference to FIGS. 2A and 2B, with reference to FIG. 3, a state of load distribution will be described with a specific example for a case during operation of the communication system 100. The communication system 100 denoted by reference numeral 301 is in a state in which no load distribution is executed; the communication system 100 denoted by reference numeral 302 is in a state in which the first load distribution is executed; and the communication system 100 denoted by reference numeral 303 is in a state in which the second load distribution is executed.

In the communication system 100 denoted by reference numeral 301, the communication apparatus 101#0 executes a moving image reproduction process and a standby process and the communication apparatus 101#1 executes no particular process. In the communication system 100 denoted by reference numeral 301 and executing no load distribution, the load amount is biased to the communication apparatus 101#0 and the load balance is poor. The poor load balance increases the power consumption of the entire communication system 100.

Poor load balance causes increases in power consumption because power consumption increases at an accelerated rate according to frequency and thus, the power consumption increases at an accelerated rate in the communication apparatus 101 having an increased load amount. Therefore, overall power consumption can be reduced if the load is distributed to lower the highest frequency. The communication traffic between the communication apparatuses 101 decreases since the communication apparatus 101#0 executes all the processes.

In the communication system 100 denoted by reference numeral 302, the communication apparatus 101#0 executes the moving image reproduction process and the communication apparatus 101#1 executes the standby process. In the communication system 100 denoted by reference numeral 302 executing the first load distribution, the load is distributed to the communication apparatus 101#0 and the communication apparatus 101#1 and load balance is improved as compared to the communication system 100 denoted by reference numeral 301. As a result of the improved load balance, the power consumption of the entire communication system 100 becomes lower than that in the communication system 100 denoted by reference numeral 301. The communication traffic between the communication apparatuses 101 becomes greater than that in the communication system 100 denoted by reference numeral 301 because inter-process communication occurs.

In the communication system 100 denoted by reference numeral 303, the communication apparatus 101#0 executes a moving image reproduction-1 thread in the moving image reproduction process and the communication apparatus 101#1 executes a moving image reproduction-2 thread in the moving image reproduction process. For example, the moving image reproduction-1 thread executes processing of a video portion of the moving image reproduction and the moving image reproduction-2 thread executes processing of an audio portion of the moving image reproduction.

In the communication system 100 denoted by reference numeral 303 executing the second load distribution, the load distribution is executed such that the load of the communication apparatus 101#0 and the load of the communication apparatus 101#1 become nearly equivalent and load balance is further improved as compared to the communication system 100 denoted by reference numeral 302. As a result of the further improved load balance, the power consumption of the entire communication system 100 becomes lower than that of the communication system 100 denoted by reference numeral 302. The communication traffic between the communication apparatuses 101 becomes greater than that of the communication system 100 denoted by reference numeral 302 because inter-thread communication occurs and more data is shared between threads.

Figure 4:
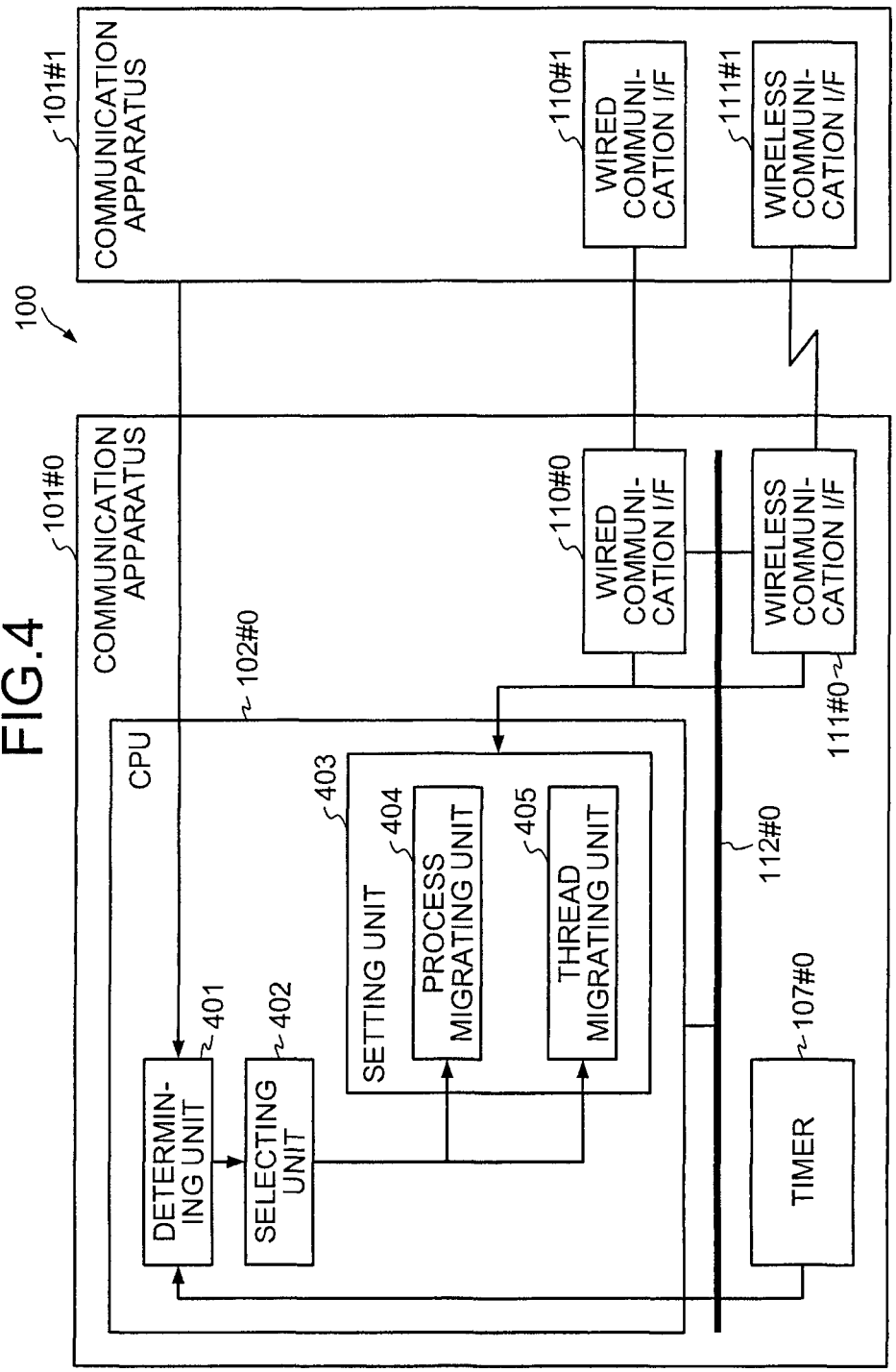
FIG. 4 is a block diagram of functions of execution determination of load distribution setting and load distribution setting of the communication system 100.

FIG. 4 is a block diagram of functions of the execution determination of load distribution setting and the load distribution setting of the communication system 100. The functions including memory management, access monitoring, and communication state monitoring of processes by the OS 203 will be described with reference to FIG. 13. The communication system 100 includes a determining unit 401, a selecting unit 402, a setting unit 403, a process migrating unit 404, and a thread migrating unit 405. These functions (the determining unit 401 to the thread migrating unit 405) acting as a control unit are implemented by the CPU 102#0 executing programs stored in a storage device. The storage device is, for example, the ROM 103#0, the RAM 104#0, and the flash ROM 106#0 depicted in FIG. 1.

Although the determining unit 401 to the thread migrating unit 405 are depicted as functions of the communication apparatus 101#0 in FIG. 4, other communication apparatuses 101 may have the determining unit 401 to the thread migrating unit 405.

The determining unit 401 has a function of determining to set the load distribution. For example, the determining unit 401 determines to set the load distribution when a difference between the load amount of the communication apparatus 101#0 and the load amount of the communication apparatus 101#1 is greater than or equal to a predetermined value. The determining unit 401 may determine to set the load distribution when a difference between a target load amount calculated from a load amount of the communication apparatus 101#0 and a load amount of the communication apparatus 101#1, and the load amount of the communication apparatus 101#0 is greater than or equal to a predetermined value. The target load amount may be calculated from the load amount and the battery remaining amount of the communication apparatus 101#0 and the load amount and the battery remaining amount of the communication apparatus 101#1. The load amount of the communication apparatus 101 is the load amount of the CPU 102 in the communication apparatus 101. A load calculation method of the CPU 102 will be described later with reference to FIG. 11.

The determining unit 401 may determine whether load distribution is to be set, based on notification from the timer 107#0. Information that indicates whether load distribution has been determined is stored to a storage device such as a register of the CPU 102#0, a cache memory, and the RAM 104#0.

The selecting unit 402 has a function of selecting (as a migration object thread) a given thread to be migrated or (as a migration object process) a given process to be migrated, if the determining unit 401 determines to set the load distribution. For example, the selecting unit 402 selects based on a transfer time from the memory of the communication apparatus 101#0 to the memory of the communication apparatus 101#1, a migration object process transferred to the memory of the communication apparatus 101#1. The selecting unit 402 may select based on the access frequency of a thread to a memory or a past transfer history of a thread, a migration object thread transferred to the communication apparatus 101#1. The transfer history may be a transfer history formed by storing into the RAM 104#0, information of a thread migrated from the communication apparatus 101#1.

The selecting unit 402 may determine, as a thread migrated in the past, a thread allocated to a CPU different from the CPU to which a process is allocated and may select the thread as the migration object thread. Information of a selected migration object thread or migration object process is stored into a storage area such as a register of the CPU 102#0, a cache memory, and the RAM 104#0.

The setting unit 403 has a function of setting execution of the first load distribution if the communication apparatus 101#0 and the communication apparatus 101#1 perform wireless communication and setting execution of the second load distribution if the communication apparatus 101#0 and the communication apparatus 101#1 perform wired communication. For example, if the selecting unit 402 selects a migration object process, the setting unit 403 instructs the process migrating unit 404 to migrate the migration object process, thereby setting the execution of the first load distribution. Similarly, if the selecting unit 402 selects a migration object thread, the setting unit 403 instructs the thread migrating unit 405 to migrate the migration object thread, thereby setting the execution of the second load distribution.

The process migrating unit 404 has a function of migrating a migration object process from the source CPU 102 to the destination CPU 102. For example, the process migrating unit 404 transfers a process data area storing data used by a process under execution from the source RAM 104 to the destination RAM 104. The process migrating unit 404 subsequently changes the CPU to which the migration object process is allocated, from the source CPU 102 to the destination CPU 102, thereby completing the migration of the migration object process. A specific migration method of a process will be described later with reference to FIG. 9.

The thread migrating unit 405 has a function of migrating a migration object thread from the source CPU 102 to the destination CPU 102. For example, the thread migrating unit 405 changes the CPU to which the migration object thread is allocated, from the source CPU 102 to the destination CPU 102. The thread migrating unit 405 performs setting such that when the destination CPU 102 accesses the process data area consequent to execution of the migration object thread, the destination CPU 102 accesses the source RAM 104 via a communication path. A specific migration method of a thread will be described later with reference to FIG. 10.

As described above, the determining unit 401 functions based on whether the communication apparatus 101 including the determining unit 401 executes the load distribution, and the selecting unit 402 and the setting unit 403 function with respect to a process or a thread allocated to the communication apparatus 101 including the selecting unit 402 and the setting unit 403. The determining unit 401 to the setting unit 403 may function for another communication apparatus 101 different from the communication apparatus 101 to which the units are allocated.

For example, it is assumed that a communication apparatus 101#2 different from the communication apparatus 101#0 and the communication apparatus 101#1 is present in the communication system 100. In this case, a determining unit included in the communication apparatus 101#2 may acquire the load amount and the battery remaining amount of the communication apparatus 101#0 and the load amount and the battery remaining amount of the communication apparatus 101#1 to determine whether the load distribution of the communication apparatus 101#0 is to be set. After the determination, a selecting unit included in the communication apparatus 101#2 refers to information of processes and threads allocated to the communication apparatus 101#0 to select a migration object thread or a migration object process.

If a migration object process is selected, the setting unit 403 included in the communication apparatus 101#2 instructs the process migrating unit 404 of the communication apparatus 101#0 to migrate the migration object process. If a migration object thread is selected, the setting unit 403 included in the communication apparatus 101#2 instructs the thread migrating unit 405 of the communication apparatus 101#0 to migrate the migration object thread.

FIG. 5 is an explanatory diagram of operation of load distribution when the communication state is the wireless connection state. FIG. 5 depicts a state in which the communication system 100 executes the first load distribution, i.e., load distribution based on a process. For example, the communication apparatus 101#0 executes a process A and a process B and the communication apparatus 101#1 executes a process C. The process A has a smaller memory usage and the processes B and C have a larger memory usage.

The communication system 100 regularly acquires loads of the communication apparatuses 101 and selects a migration object process and migrates the migration object process if load balance deteriorates. A selection method of the migration object process is to select a process having the smallest memory usage among processes executed in the communication apparatus 101 having the larger load amount.

For example, in FIG. 5, an increase in the load amount of the communication apparatus 101#0 deteriorates the load balance. The communication apparatus 101#0 selects the process A having the smallest memory usage as the migration object process among the processes A and B executed by the CPU 102#0 and migrates the process A to the communication apparatus 101#1. For a method of selecting whether a process is to be migrated, the communication system 100 makes a selection based on a migration cost calculated from a memory usage of the migration object process and the load balance. The migration cost may be calculated by using Equation (1).

$$\text{migration cost} = \text{memory usage of migration object process}/\text{communication speed} \quad (1)$$

The communication system 100 calculates a migration cost by using Equation (1) and compares the migration cost and a difference of the current load amount of the communication apparatus 101#1 and a target load amount (i.e., a target value equalizing the load balance). After the comparison, if the difference is greater than or equal to the migration cost, the communication system 100 migrates the migration object process. A migration method of the migration object process in wireless communication will be described later with reference to FIG. 9. An example of calculating a specific migration cost will be described with reference to FIG. 11.

Figure 6:
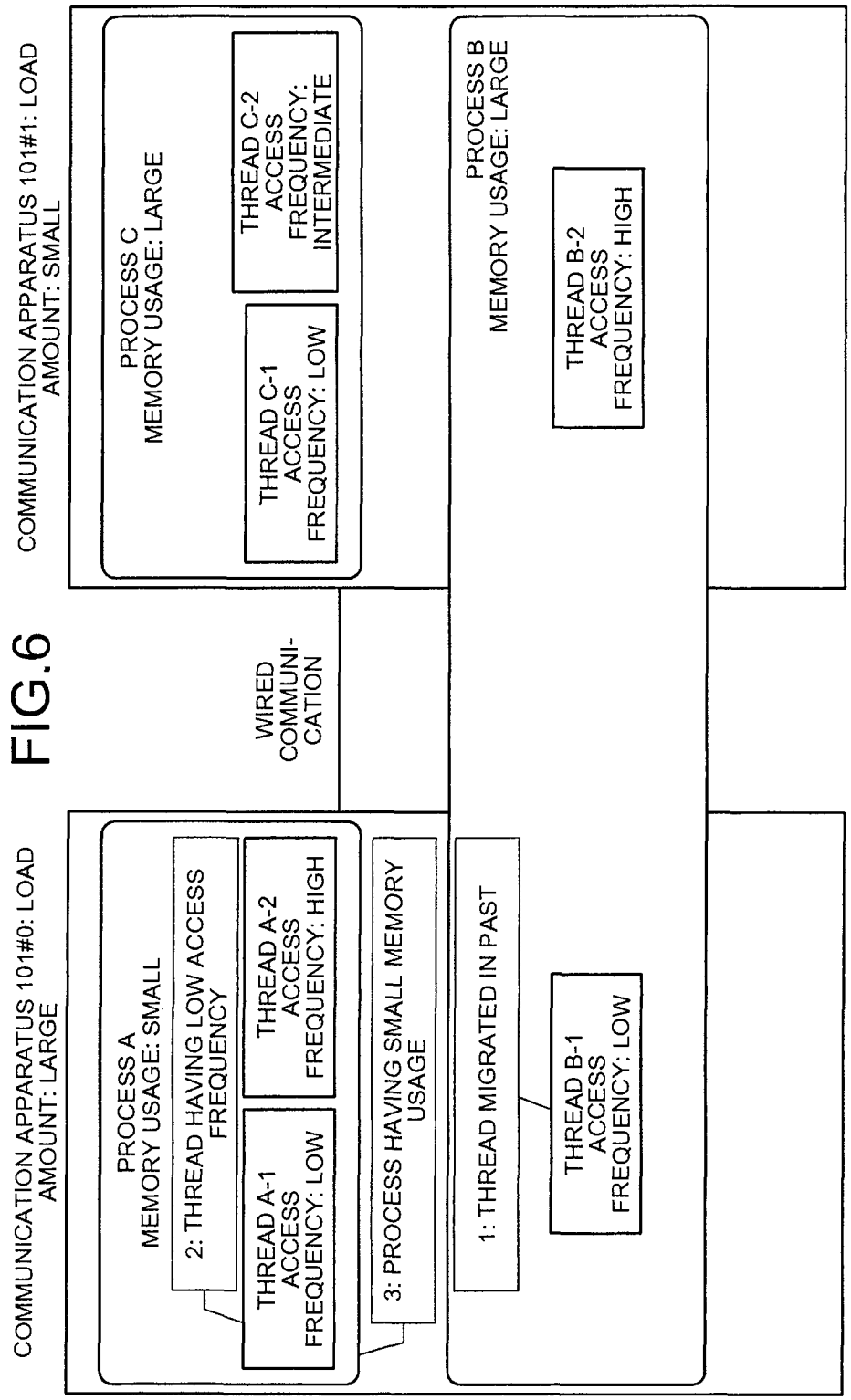
FIG. 6 is an explanatory diagram of operation of load distribution when the communication state is a wired connection state.

FIG. 6 is an explanatory diagram of operation of load distribution when the communication state is the wired connection state. FIG. 6 depicts a state in which the communication system 100 performs the second load distribution, i.e., load distribution based on a thread. For example, the communication apparatus 101#0 executes a thread A-1 and a thread A-2 in the process A and a thread B-1 in the process B and the communication apparatus 101#1 executes a thread B-2 in the process B and a thread C-1 and a thread C-2 in the process C. The memory usages of the processes A to C are equal to the state depicted in FIG. 5.

With regard to the access frequencies of the threads, the threads A-1, B-1, and C-1 have a lower access frequency, and the threads A-2 and B-2 have a higher access frequency. The access frequency of the thread C-2 is between the thread group with the lower access frequency and the thread group with the higher access frequency.

The communication system 100 regularly acquires each load of the communication apparatuses 101 and selects a migration object thread or a migration object process and migrates the migration object thread or the migration object process if the load balance deteriorates. A method of selecting the migration object thread or the migration object process is to make the selection from among the threads or processes executed in the communication apparatus 101 having a larger load amount based on the following selection methods.

Selection method 1: The communication apparatus 101 having the larger load amount selects as a migration object thread and from among executed threads, a thread migrated in the past. If a thread migrated in the past does not exist, the communication apparatus 101 having the larger load amount attempts selection according to a selection method 2.

Selection method 2: The communication apparatus 101 having the larger load amount selects as a migration object thread and from among executed threads, a thread having the lowest access frequency. The communication apparatus 101 having the larger load amount verifies whether migration of a thread brings the load balance closer to the target load amount in ascending order of access frequency. If no thread brings the load balance closer to the target load amount, the communication apparatus 101 having the larger load amount attempts selection according to a selection method 3.

Selection method 3: The communication apparatus 101 having the larger load amount selects as a migration object process and from among executed processes, a process having a smaller memory usage.

The communication system 100 performs the selection methods 1 to 3 to select a migration object thread or a migration object process and migrates the migration object thread or the migration object process. A method of migrating the migration object thread or the migration object process in wired communication will be described later with reference to FIG. 10. In the selection methods 1 and 2, selection is made based on the migration cost of migrating a thread and the load balance. A calculation example of migration cost will be described later with reference to FIG. 12.

As described above, when the communication apparatuses 101 are in the wired connection state, the second load distribution, i.e., load distribution based on a thread is effective since the communication apparatuses 101 can communicate with each other at high speed. However, unlike a completely shared memory-type multicore system, a slight delay occurs when a communication apparatus 101 refers to the memory of the other communication apparatus 101 as compared to when referring to its own memory and therefore, migration of a process frequently performing memory access may deteriorate the efficiency. Therefore, if no thread improves the efficiency when migration is performed according to the selection method 1 or 2, the communication system 100 executes the first load distribution, i.e., load distribution based on process, according to the selection method 3.

Figure 7:
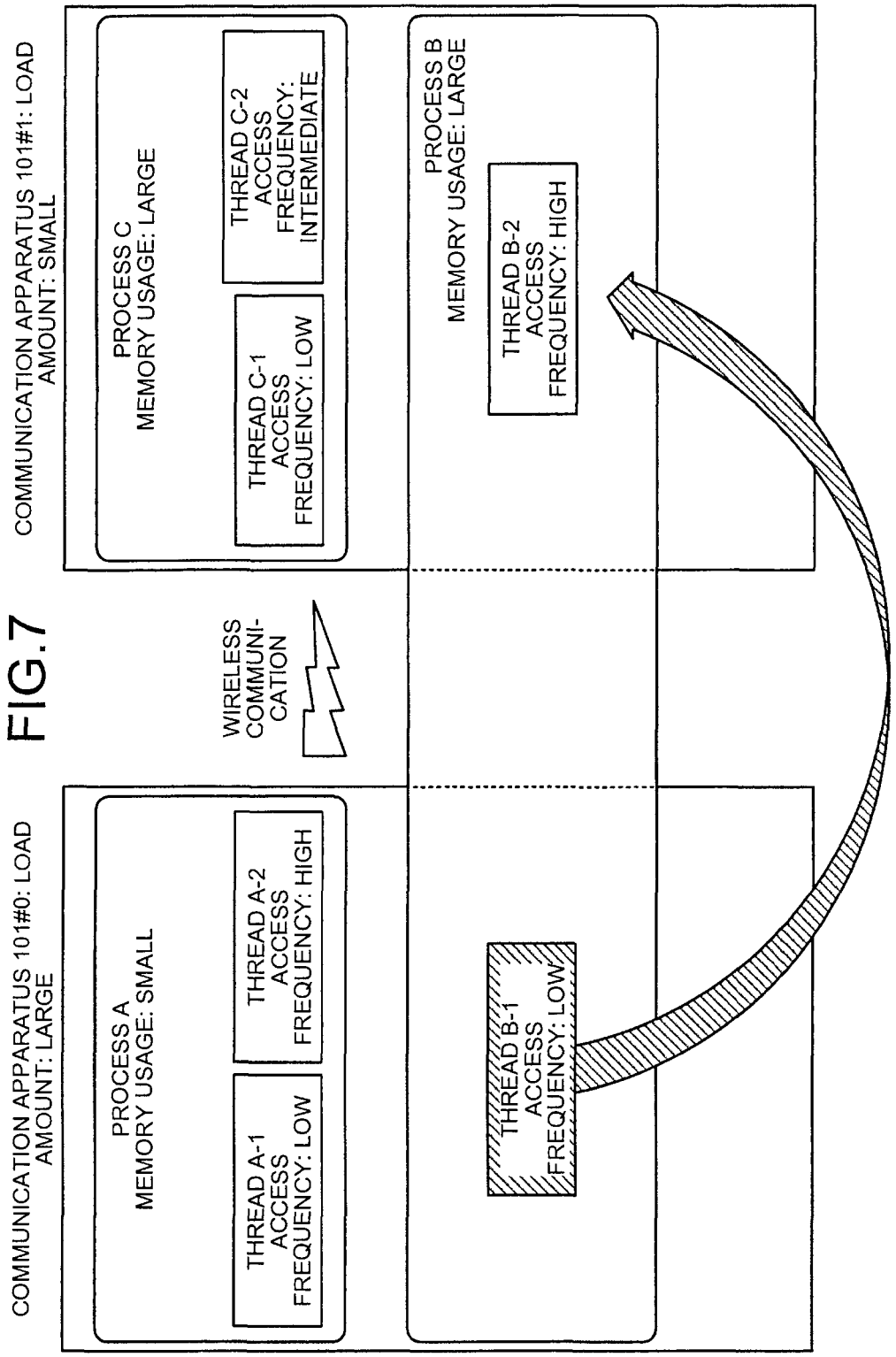
FIG. 7 is an explanatory view of operation when the communication state shifts from the wired connection state to the wireless connection state.

FIG. 7 is an explanatory view of operation when the communication state shifts from the wired connection state to the wireless connection state. FIG. 7 depicts operation when the communication state shifts from the wired connection state in which the communication apparatus 101#0 and the communication apparatus 101#1 are coupled, to the wireless connection state due to release of the coupling between the communication apparatus 101#0 and the communication apparatus 101#1. A state of threads and processes in FIG. 7 is equal to the state depicted in FIG. 6. Since the communication system 100 executes the second load distribution causing larger communication traffic during the wired connection state, the shift is made to the first load distribution causing smaller communication traffic.

In the example of FIG. 7, the communication system 100 executes the second load distribution and the communication apparatus 101#0 executes the migrated thread B-1. If a shift to the wireless connection state is made in this state, the efficiency of the communication system 100 deteriorates because communication traffic is great irrespective of the reduction in communication speed. Therefore, the communication apparatus 101#0 migrates the thread B-1 to the communication apparatus 101#1 so that the communication system 100 executes the first load distribution.

Figure 8:
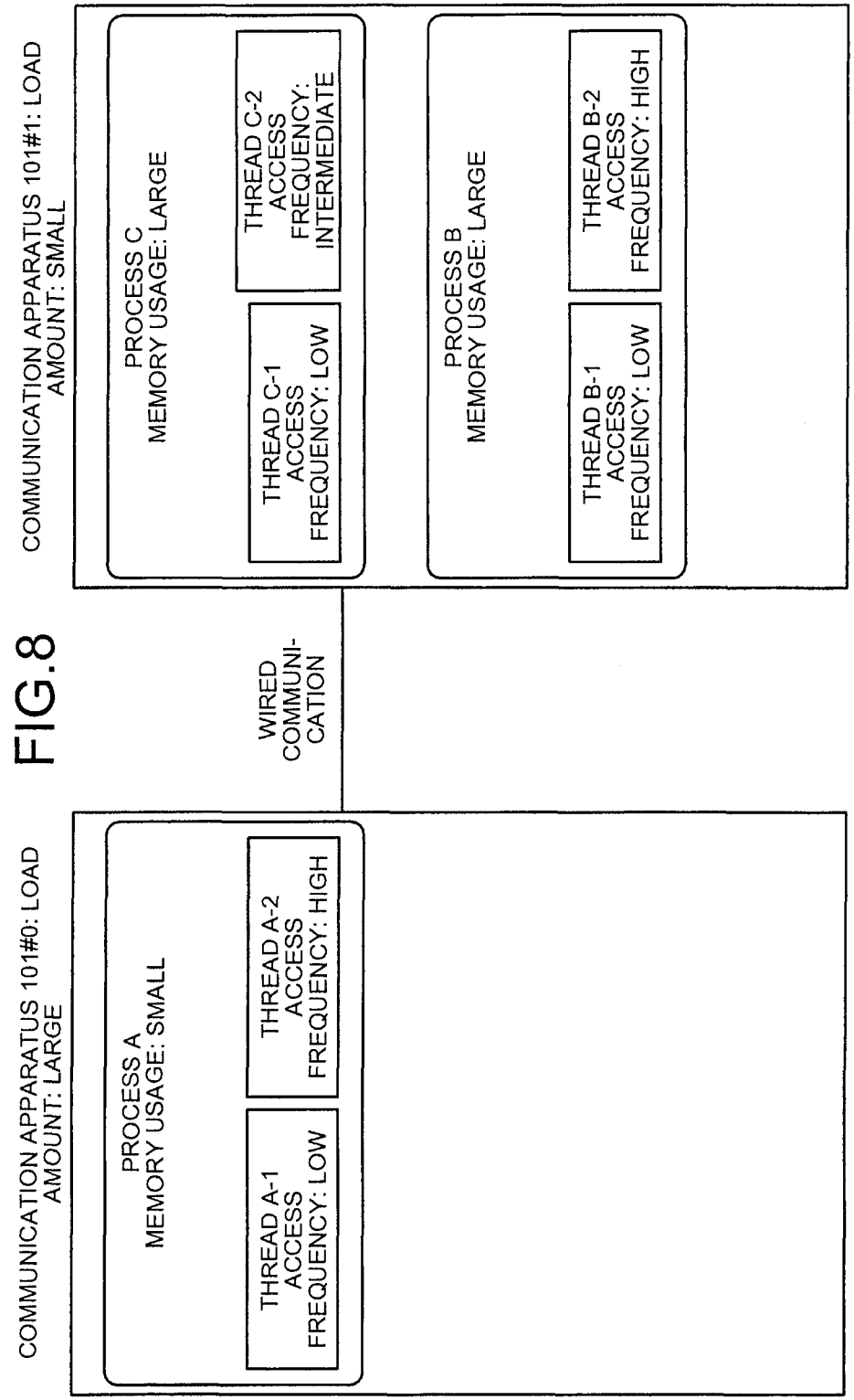
FIG. 8 is an explanatory view of operation when the communication state shifts from the wireless connection state to the wired connection state.

FIG. 8 is an explanatory view of operation when the communication state shifts from the wireless connection state to the wired connection state. FIG. 8 depicts operation when the communication state shifts from the wireless connection state in which the coupling between the communication apparatus 101#0 and the communication apparatus 101#1 is released, to the wired connection state due to coupling of the communication apparatus 101#0 and the communication apparatus 101#1. With regard to the state of threads and processes in FIG. 8, the access frequencies of the threads and the memory usages of the processes are equal to the state depicted in FIG. 6. With regard to the allocation of the processes, the communication apparatus 101#0 executes the process A and the communication apparatus 101#1 executes the processes B and C.

Since the second load distribution based on thread enables load distribution with finer granularity and more easily achieves the load balance as compared to the first load distribution based on process, the communication system 100 considers the load distribution again in the wired connection state. For example, the communication system 100 executes the setting of the second load distribution depicted in FIG. 6 to improve the load balance between the communication apparatuses 101.

Figure 9:
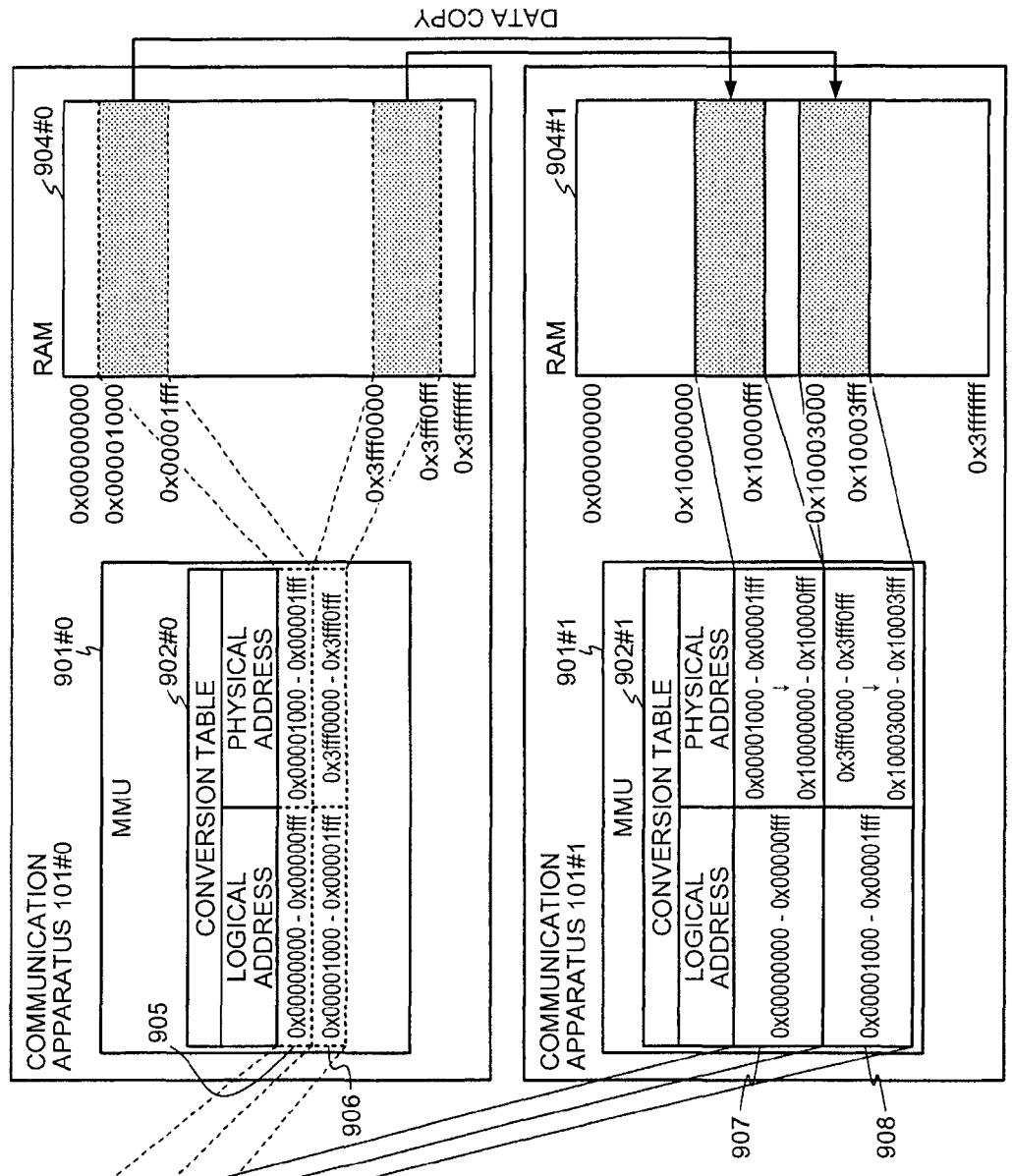
FIG. 9 is an explanatory view of a migration method of migrating a process between communication apparatuses 101.

FIG. 9 is an explanatory view of a migration method of migrating a process between the communication apparatuses 101. A memory management unit (MMU) 901 processing memory access requested by a CPU is present in the communication apparatuses 101. Although functions of the MMU 901 include various processes related to memory access, the migration method of a process and the migration method of a thread will be described by using a function of converting a logical address into a physical address among the functions of the MMU 901 with reference to FIGS. 9 and 10.

First, the function of the MMU 901 of converting a logical address into a physical address will be described. The MMU 901 refers to a conversion table 902. The conversion table 902 is a table that includes two fields, a logical address field and a physical address field, and correlates a logical address with a physical address. The conversion table 902 is present for each process and is stored in the RAM 104. The logical address is an address in a logical address space 903 accessed by the process A and the physical address is an address of a physical address space 904 allocated to the ROM 103, the RAM 104, etc.

For example, taking a conversion table 902#0 as an example, if the CPU 102#0 makes an access request to a logical address "0x00000010", an MMU 901#0 converts the address into "0x00001010" using the conversion table 902#0.

Figure 10:
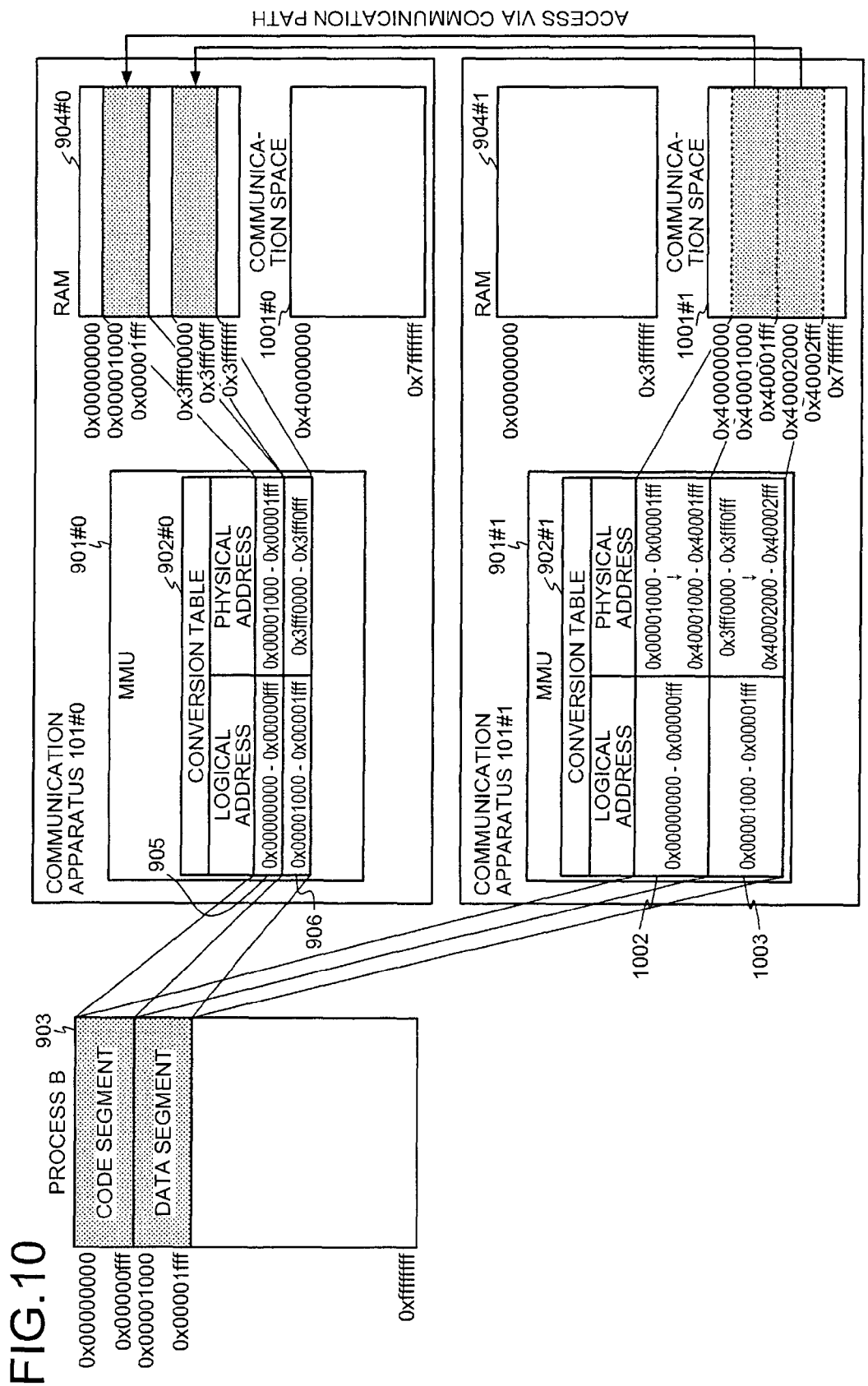
FIG. 10 is an explanatory view of a migration method of a thread between communication apparatuses 101.

The migration method of a process in the wireless connection state will be described. It is assumed that the process B executed by the communication apparatus 101#0 is migrated to the communication apparatus 101#1. The logical address space 903 of the process B includes a code segment storing program code and a data segment storing a variable, etc. Although not depicted in FIGS. 9 and 10, areas to be migrated other than the code segment and the data segment include a heap segment, a stack segment, etc., dynamically established during execution of a process.

It is assumed that a logical address range of the code segment is "0x00000000" to "0x00000fff" and that a logical address range of the data segment is "0x00001000" to "0x00001fff".

The MMU 901#0 refers to a record 905 of the conversion table 902#0 to convert the logical address range "0x00000000" to "0x00000fff" into a physical address range "0x00001000" to "0x00001fff". The MMU 901#0 refers to a record 906 to convert the logical address range "0x00001000" to "0x00001fff" into a physical address range "0x3fff0000" to "0x3fff0fff".

When a migration request of the process B is made, the communication system 100 copies to a physical address space 904#1, the area used by the process B in a physical address space 904#0. For example, the communication system 100 copies to an area "0x10000000" to "0x10000fff" in the physical address space 904#1, an area "0x00001000" to "0x00001fff" in the physical address space 904#0. Similarly, the communication system 100 copies to an area "0x10003000" to "0x10003fff" in the physical address space 904#1, an area "0x3fff0000" to "0x3fff0fff" in the physical address space 904#0.

After copying the data, the communication system 100 reconstructs the conversion table 902. For example, the communication apparatus 101#1 uses the function of the OS 203#1 to generate a record 907 and a record 908 in the conversion table 902#1 by reference to the record 905 and the record 906 of the conversion table 902#0.

The communication apparatus 101#1 then rewrites the physical address field of the record 907 from "0x00001000" to "0x00001fff" into "0x10000000" to "0x10000fff". Similarly, the communication apparatus 101#1 rewrites the physical address field of the record 908 from "0x3fff0000" to "0x3fff0fff" into "0x10003000" to "0x10003fff". After the copying is completed, the records 905 and 906 may be deleted.

As described above, in the migration method depicted in FIG. 9, a process is migrated by copying the data of the process stored in the physical address space 904. In the following description, the migration method described with reference to FIG. 9 will be referred to as a first migration method.

FIG. 10 is an explanatory view of a migration method of a thread between the communication apparatuses 101. In FIG. 10, it is assumed that the thread B-1 in the process B executed by the communication apparatus 101#0 is migrated to the communication apparatus 101#1. A state of the logical address space 903, the conversion table 902#0, and the physical address space 904#0 of the process B is equal to the state of process B before migration in FIG. 9.

When a migration request of the thread B-1 is made, the communication system 100 establishes a communication space 1001 that is an address space different from the physical address space 904. For example, the communication apparatus 10140 establishes an area "0x40000000" to "0x7fffffff" as a communication space 1001#0. Similarly, the communication apparatus 101#1 establishes the area "0x40000000" to "0x7fffffff" as a communication space 1001#1. Although the areas of the communication spaces 1001 are identical between the communication apparatus 101#0 and the communication apparatus 101#1 in the example of FIG. 10, the areas with different addresses may be established.

The established communication space 1001 is correlated with the physical address space 904 of the other communication apparatus 101. For example, the address "0x40000000" of the communication space 1001#1 is correlated with "0x00000000" of the physical address space 904#0.

The communication system 100 reconstructs the conversion table 902. For example, the communication apparatus 101#1 uses the function of the OS 203#1 to generate a record 1002 and a record 1003 in the conversion table 902#1 by referring to the record 905 and the record 906 of the conversion table 902#0. The communication apparatus 101#1 then rewrites the physical address fields of the records 1002 and 1003 into the addresses of the correlated communication space 1001.

For example, the communication apparatus 101#1 rewrites the physical address field of the record 1002 from "0x00001000" to "0x00001fff" into "0x40001000" to "0x40001fff". Similarly, the communication apparatus 101#1 rewrites the physical address field of the record 1003 from "0x3fff0000" to "0x3fff0fff" into "0x40002000" to "0x40002fff". After rewriting, the communication system 100 allocates to the CPU 102#1, the thread B-1 allocated to the CPU 102#0. As a result, the migration of the thread B-1 is completed.

After the migration is completed, if an access request to the communication space 1001#1 is made through the conversion by the MMU 901#0 during execution of the thread B-1, the CPU 102#1 accesses the correlated physical address space 904#0 via a communication path. For example, if the CPU 102#1 executes a read request to the logical address "0x00000010", the MMU 901#1 performs conversion into the address "0x40000010" of the communication space 1001#1. Subsequently, the communication apparatus 101#1 acquires data at the address "0x00000010" of the physical address space 904#0 corresponding to the address "0x40000010" of the communication space 1001#1 via the wired communication I/F 110.

As described above, in the migration method depicted in FIG. 10, if a communication space 1001 is established and accessed, by accessing data stored in the correlated physical address space 904 of the other communication apparatus 101, a thread is migrated. In the following description, the migration method described with reference to FIG. 10 will be referred to as a second migration method. In the second migration method, data of the RAM 104 of a given communication apparatus 101 is shared between the given communication apparatus 101 and the other communication apparatus 101.

In the second migration method described with reference to FIG. 10, memory entities to be counted by an access counter 113 include the communication space 1001 along with the physical memory such as the RAM 104. For example, when the CPU 102#1 accesses the communication space 1001#1, the CPU 102#1 increments an access counter 113#1.

In comparing the first migration method with the second migration method in terms of overhead, the first migration method has a larger overhead because of the time consumed for copying data. The second migration method has a smaller overhead since only establishment of the communication space 1001 and rewriting of the conversion table 902 are necessary. In terms of communication traffic of the first migration method and the second migration method, once data copying is performed, the first migration method has less communication traffic. The second migration method has greater communication traffic because communication occurs each time an access request is made.

Figure 11:
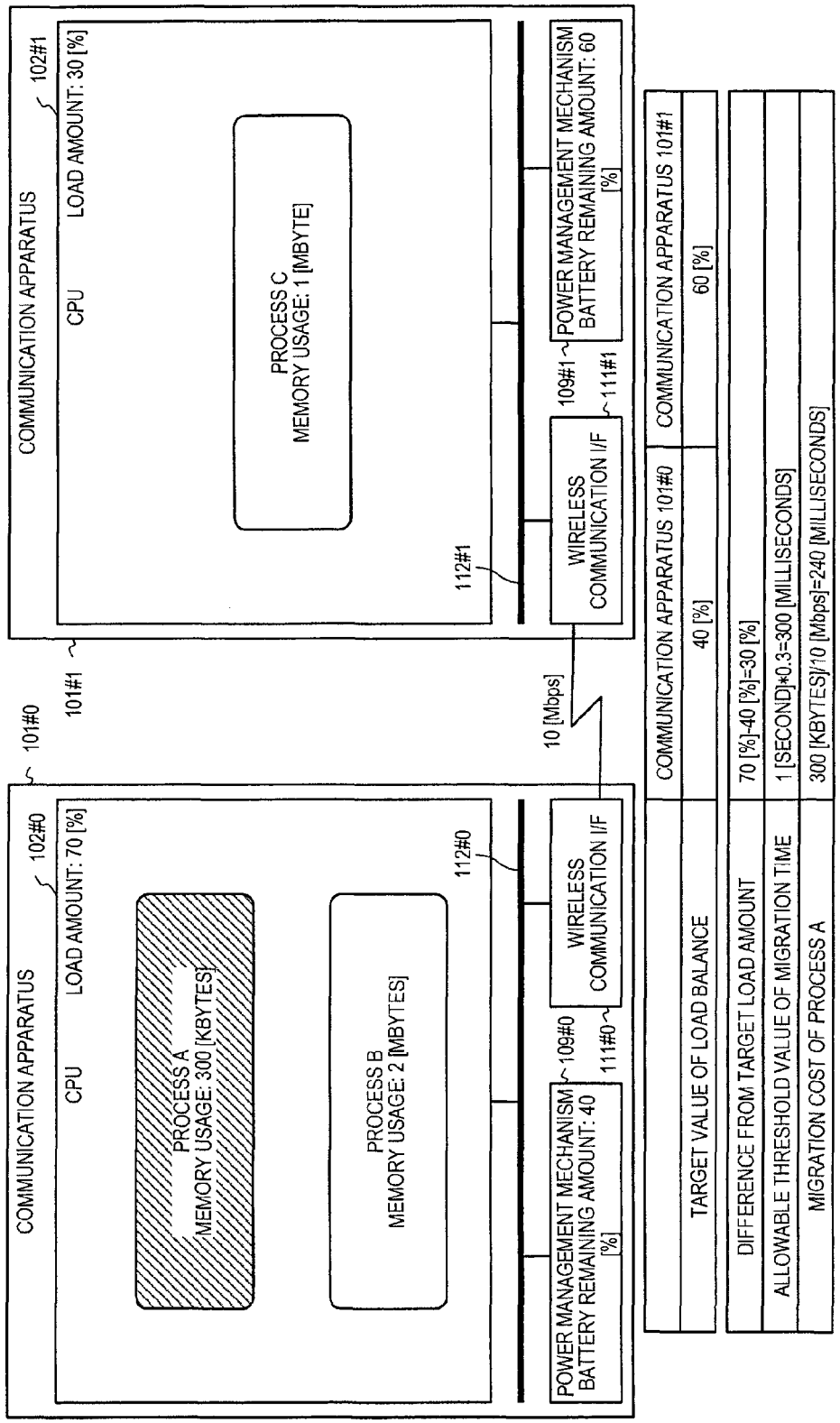
FIG. 11 is an explanatory view of an example of selection of a migration object process in first load distribution.

FIG. 11 is an explanatory view of an example of selection of a migration object process in the first load distribution. The communication system 100 depicted in FIG. 11 is connected through wireless communication and executes the first load distribution. For example, the communication apparatus 101#0 executes the process A and the process B and the communication apparatus 101#1 executes the process C. The memory usages of the processes A to C are the process A: 300 [Kbytes], the process B: 2 [Mbytes], and the process C: 1 [Mbyte].

Assuming that the maximum load amount applied to the CPU 102#0 is 100 [%], a load amount of the CPU 102#0 is 70 [%], and a battery remaining amount of the communication apparatus 101#0 is 40 [%]. Similarly, a load amount of the CPU 102#1 is 30 [%], and a battery remaining amount of the communication apparatus 101#1 is 60 [%]. A communication speed of the wireless communication is 10 [Mbps].

A calculation method for a load amount of a CPU is to calculate a rate of an execution time per unit time of the CPU as a load amount. Another calculation method may be calculation based on the number of processes allocated to the CPU. Alternatively, the sum of processing amount information added to processes allocated to a CPU may be calculated as a load amount of the CPU. The processing amount information is measured in advance for each of the processes.

A target value of load balance may be calculated based on the battery remaining amounts of the communication apparatuses 101. For example, if the battery remaining amounts of the communication apparatuses 101 are equal to each other or if the battery remaining amounts are not considered, the communication system 100 sets the target values of the load balance to 1:1. For example, if a load amount of the communication apparatus 101#0 is 70 [%] and a load amount of the communication apparatus 101#1 is 30 [%], the communication system 100 sets the target values of the load balance to 50 [%]:50 [%]. If the battery remaining amounts of the communication apparatuses 101 are at the ratio of 6:4, the communication system 100 sets the target values of the load balance such that the load balance is also set to the ratio of 6:4. If underlying power consumption is different in each of the communication apparatuses 101, the communication system 100 sets the target values of the load balance from a power consumption amount ratio and a battery remaining amount ratio.

In the example of FIG. 11, since the battery remaining amount of the communication apparatus 101#0 is 40 [%] and the battery remaining amount of the communication apparatus 101#1 is 60 [%], the target values of the load balance are set to 40 [%] for the communication apparatus 101#0 and 60 [%] for the communication apparatus 101#1. A difference of the current load amount and the target load amount of the communication apparatus 101#0 having a larger load amount is 70 [%]−40 [%]=30 [%].

The communication apparatus 101#0 then selects a migration object process from a process group under execution. The migration object process is a process satisfying conditions such as that the migration brings the load balance of the communication apparatus 101#0 closer to the target value of the load balance and that the migration cost is sufficiently small relative to a difference from the target load amount. Since a load amount of a CPU is a rate of an execution time per unit time of the CPU, for example, the communication apparatus 101#0 calculates a time acquired by multiplying a load amount monitoring interval by a difference from the target load amount as an allowable threshold value of migration time and compares the allowable threshold value of migration time with the migration cost. If the migration cost is smaller, the effect of increasing an operating rate due to load improvement is greater than the time consumed for the migration.

In the example of FIG. 11, when it is assumed that the load amount monitoring interval is 1 [second], the allowable threshold value of migration time is 1 [second]*0.3=300 [milliseconds]. Since a process having a smaller migration cost is a process having a smaller memory usage according to Equation (1), the process A is the process having the smallest migration cost in the example of FIG. 11. The migration cost of the process A is 300 [Kbyte]/10 [Mbps]=240 [milliseconds] from Equation (1). As a result, because of 300≥240, the communication apparatus 101#0 selects the process A as the migration object process.

Figure 12:
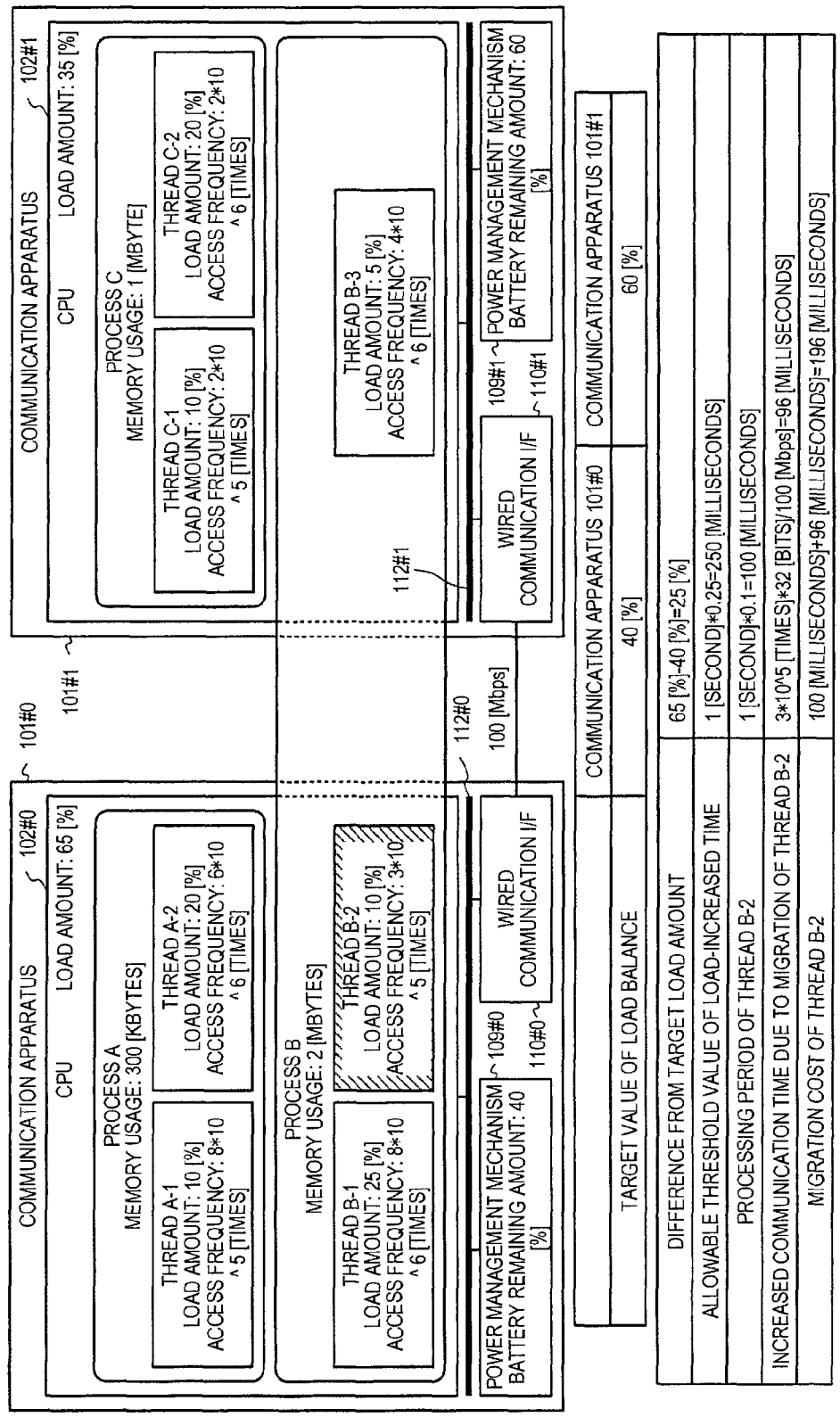
FIG. 12 is an explanatory view of an example of selection of a migration object thread in second load distribution.

FIG. 12 is an explanatory view of an example of selection of a migration object thread in the second load distribution. The communication system 100 depicted in FIG. 12 is connected through the wired communication I/F 110#0 and the wired communication I/F 110#1, and executes the second load distribution. For example, the communication apparatus 101#0 executes the process A, the thread B-1 and the thread B-2 in the process B; and the communication apparatus 101#1 executes the thread B-3 in the process B and the process C.

The memory usages of the processes A to C are the process A: 300 [Kbytes], the process B: 2 [Mbytes], and the process C: 1 [Mbyte]. It is assumed that an access frequency of a thread is the number of accesses to a memory during the load amount monitoring interval. For example, the access frequencies are $8*10^5$ [times] in the thread A-1 in the process A-1, $6*10^6$ [times] in the thread A-2, $8*10^6$ [times] in the thread B-1, and $3*10^5$ [times] in the thread B-2. The access frequencies are $4*10^6$ [times] in the thread B-3, $2*10^5$ [times] in the thread C-1, and $2*10^6$ [times] in the thread C-2.

The load amount of the CPU 102#0 is 65 [%] and the battery remaining amount of the communication apparatus 101#0 is 40 [%]. The load amount of the CPU 102#1 is 35 [%] and the battery remaining amount of the communication apparatus 101#1 is 60 [%]. The communication speed of the wired communication is 100 [Mbps]. Since the battery remaining amount of the communication apparatus 101#0 is 40 [%] and the battery remaining amount of the communication apparatus 101#1 is 60 [%], the target value of the load balance is set to 40 [%] for the communication apparatus 101#0 and 60 [%] for the communication apparatus 101#1. A difference of the current load amount and the target load amount of the communication apparatus 101#0 having a larger load amount is 65 [%]−40 [%]=25 [%].

The communication apparatus 101#0 then selects a migration object thread from a thread group under execution. The migration object thread is a thread satisfying conditions such as that the load balance is brought closer to the target value with consideration also given to an increase in load due to the migration. If a thread is migrated from the communication apparatus 101#0 to the communication apparatus 101#1, the time associated with communication increases. Therefore, the communication apparatus 101#0 calculates the time by multiplying a load amount monitoring interval by the difference of the current load amount and the target load amount as an allowable threshold value of migration time and compares the allowable threshold value of migration time with a migration cost that is the sum of a thread processing period and an increased communication time due to thread migration. If the migration cost is smaller, the effect of increasing an operating rate due to load improvement is greater than the time consumed for the migration.

A calculation method for the increased communication time due to thread migration can be calculated from Equation (2).

increased communication time=thread access frequency*data amount of one access/communication speed    (2)

In the example of FIG. 12, when it is assumed that the load amount monitoring interval is 1 [second], the allowable threshold value of migration time is 1 [second]*0.25=250 [milliseconds]. Since a thread having a smaller increased communication time is a thread having a smaller thread access frequency according to Equation (2), the thread B-2 is the thread having the smallest increased communication time in the example of FIG. 12. With regard to the processing period of the thread B-2, the load amount of the thread B-2 is 10 [%] and, therefore, the CPU 102#0 executes the thread B-2 for 10 [%] of the load amount monitoring interval, i.e., 1 [second]*0.1=100 [milliseconds].

Assuming that a data amount of one access is 32 [bits], the increased communication time due to the migration of the thread B-2 is calculated from Equation (2) as $3*10^5$ [times] *32/100 [Mbps]=96 [milliseconds]. As a result, the migration cost of the thread B-2 is 100 [milliseconds]+96 [milliseconds]=196 [milliseconds]. Comparing the allowable threshold value of migration time with the migration cost, because of $250 \geq 196$, the communication apparatus 101#0 selects the thread B-2 as the migration object thread.

If threads migrated from the other communication apparatus 101 exist in the thread group executed by the communication apparatus 101 having a larger load amount, the communication apparatus 101 may select as the migration object thread and among the migrated threads, a thread having the highest access frequency. Since a migrated thread always generates load associated with communication, the returning of the migrated thread to the source communication apparatus 101 reduces the communication traffic between the communication apparatuses 101 and reduces the load amount of the communication apparatus 101 having a larger load amount. The load amount of the entire communication system 100 is also reduced by the load associated with the communication between the communication apparatuses 101.

Figure 13:
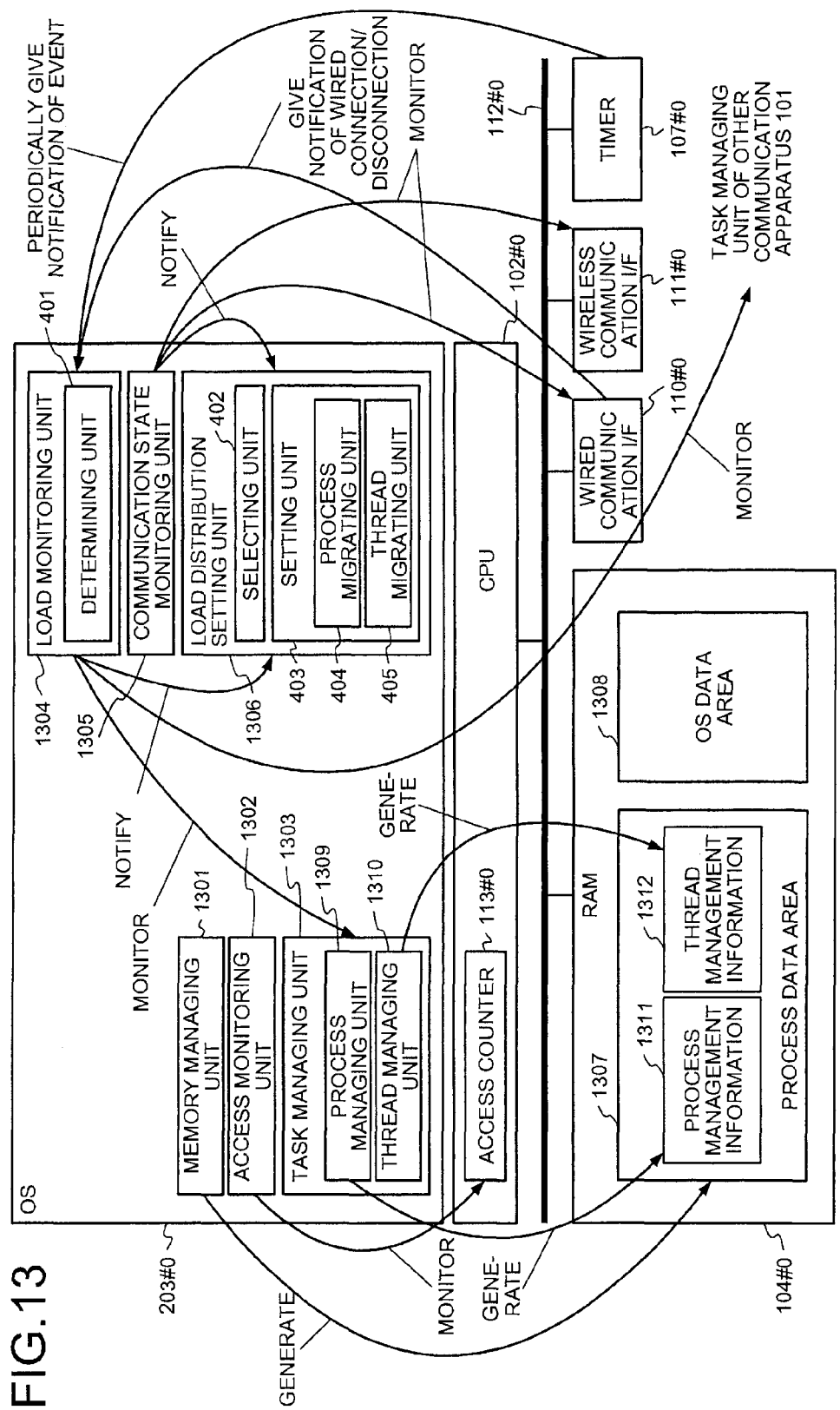
FIG. 13 is a block diagram of functions of the communication system 100.

FIG. 13 is a block diagram of functions of the communication system 100. FIG. 13 depicts functions including the function of the OS 203 and the load distribution setting function. Although FIG. 13 depicts the functions of the communication apparatus 101#0, the communication apparatus 101#1 has functions equal to the communication apparatus 101#0.

The communication apparatus 101#0 includes a memory managing unit 1301, an access monitoring unit 1302, a task managing unit 1303, a load monitoring unit 1304, a communication state monitoring unit 1305, and a load distribution setting unit 1306. The RAM 104#0 stores a process data area 1307 and an OS data area 1308. The task managing unit 1303 includes a process managing unit 1309 and a thread managing unit 1310. The load monitoring unit 1304 includes the determining unit 401. The load distribution setting unit 1306 includes the selecting unit 402, the setting unit 403, the process migrating unit 404, and the thread migrating unit 405. The process data area 1307 includes process management information 1311 and thread management information 1312.

The memory managing unit 1301 has a function of managing an area used by a process. For example, if a new process is generated, the memory managing unit 1301 establishes the process data area 1307 on the RAM 104#0. The memory managing unit 1301 sets a memory size established by the process as a memory usage in the process management information 1311.

The access monitoring unit 1302 refers to the access counter 113#0 disposed in the CPU 102#0 and updates access frequency of a thread. For example, when notified by the timer 107#0, the access monitoring unit 1302 refers to the access counter 113#0 and updates the access frequency of the thread management information 1312 corresponding to the thread currently operated by the CPU 102#0.

The task managing unit 1303 has a function of allocating a process or a thread to the CPU 102#0 for execution. The task managing unit 1303 calculates the load amount of the communication apparatus 101#0 and the load amount of each thread, from the operating rate of the CPU 102#0 and the rate of execution time of each thread in operation. After the calculation, the task managing unit 1303 records the load amount of the communication apparatus 101#0 into the OS data area 1308 of the RAM 104 and the load amount of a thread into the thread management information 1312. The task managing unit 1303 performs an operation, such as reducing a frequency and a voltage in the case of a lower load amount and increasing a frequency and a voltage in the case of a higher load amount, depending on a load status of the task managing unit 1303 through the control of the power management mechanism 109#0.

The process managing unit 1309 of the task managing unit 1303 deploys an execution image of a process from the ROM 103 to the process data area 1307. The process managing unit 1309 generates the process management information 1311 in the process data area 1307. If a thread is generated, the thread managing unit 1310 of the task managing unit 1303 generates the thread management information 1312 in the process data area 1307.

The load monitoring unit 1304 has a function of monitoring the load status of the CPU 102#0. For example, the load monitoring unit 1304 acquires the load amount of the communication apparatus 101 thereof and load amounts of the other communication apparatuses 101 and, if a difference between its own load amount and the load amount of the communication apparatus having the smallest load is greater than or equal to a predetermined value, the load monitoring unit 1304 causes the determining unit 401 to determine execution of load distribution. For example, the determining unit 401 instructs the load distribution setting unit 1306 to execute the load distribution. Alternatively, the load monitoring unit 1304 sets a target load amount based on its own load amount and battery remaining amount and, if the load amount difference is greater than or equal to a predetermined value, the load monitoring unit 1304 may instruct the load distribution setting unit 1306 to set the load distribution. With regard to the acquisition of the load amount of the communication apparatus 101#0, the load monitoring unit 1304 acquires the load amount from the task managing unit 1303.

The communication state monitoring unit 1305 has a function of monitoring a current communication state. For example, the communication state monitoring unit 1305 is notified of disconnection or connection of wired communication by the wired communication I/F 110#0 and instructs the load distribution setting unit 1306 to set the load distribution adapted to the current communication state.

The load distribution setting unit 1306 has a function of setting the load distribution. For example, the load distribution setting unit 1306 causes the selecting unit 402 to select a migration object thread or a migration object process and the setting unit 403 to set the load distribution. If the migration object process is selected, the load distribution setting unit 1306 causes the process migrating unit 404 to migrate the migration object process, thereby setting the load distribution of the communication system 100 to the first load distribution. If the migration object thread is selected, the load distribution setting unit 1306 causes the thread migrating unit 405 to migrate the migration object thread, thereby setting the load distribution of the communication system 100 to the second load distribution.

The process data area 1307 is an area storing data used during execution of a process. The process data area 1307 includes the process management information 1311 and the thread management information 1312 items equivalent in number to the number of threads included in the process. Contents stored in the process data area 1307 will be described with reference to FIG. 14. The OS data area 1308 is an area storing a state of the communication apparatus 101. The OS data area 1308 will also be described with reference to FIG. 14.

Figure 14:
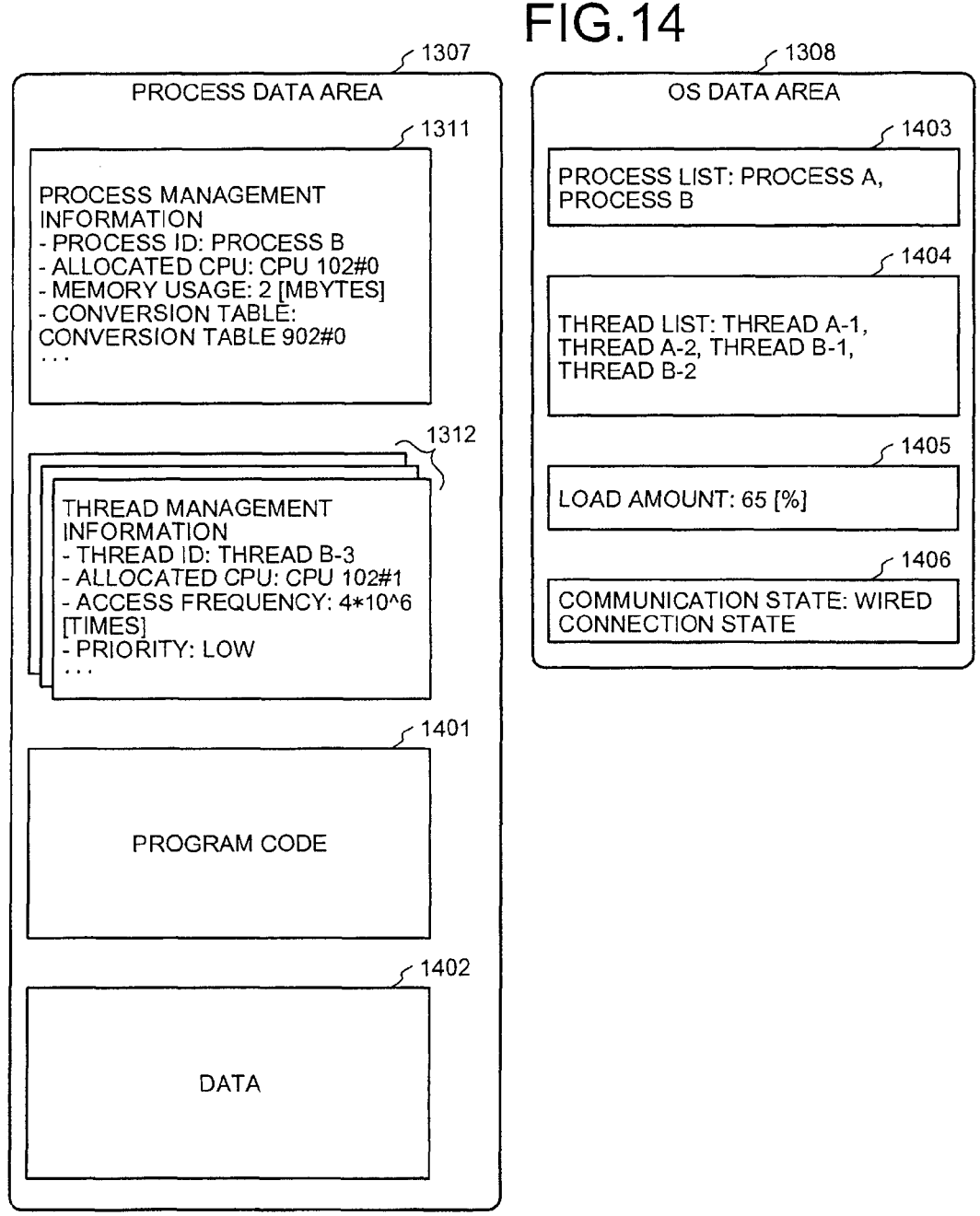
FIG. 14 is an explanatory view of an example of the contents stored in a process data area 1307 and an OS data area 1308.

FIG. 14 is an explanatory view of an example of the contents stored in the process data area 1307 and the OS data area 1308. The process data area 1307 includes the process management information 1311, the thread management information 1312, program code 1401, and data 1402.

The process management information 1311 includes four fields, including process ID, allocated CPU, memory usage, and conversion table. The process ID field stores information uniquely identifying the corresponding process. For example, the process ID field may store the name of a process or may store a pointer that indicates an address at which the process data area 1307 is stored, etc. The allocated CPU field stores the ID of a CPU to which the corresponding process is allocated. The memory usage field stores the memory size established by the corresponding process in the RAM 104. The conversion table field stores a pointer to the conversion table 902 accessed by the MMU 901.

For example, taking as an example the stored values of the fields of the process management information 1311 for the process B in FIG. 12, the process ID field stores an ID that is "process B". The allocated CPU field stores an ID that is "CPU 102#0". The memory usage field stores a numeric value of 2 [Mbyte]. The conversion table field stores a pointer to the conversion table 902#0.

The thread management information 1312 includes four fields, including thread ID, allocated CPU, access frequency, and priority. The thread ID field stores information uniquely identifying the corresponding thread. The allocated CPU field includes the ID of a CPU to which the corresponding thread is allocated. The access frequency field stores an access frequency of the corresponding thread to the RAM 104. The priority field stores the priority of the corresponding thread.

For example, taking as an example the stored values of the fields of the thread management information 1312 for the thread B-2 in FIG. 12, the thread ID field stores an ID that is "thread B-3". The allocated CPU field stores an ID that is "CPU 102#1". The access frequency field stores a numeric value of $4*10^6$ [times]. The priority field stores information "low".

The program code 1401 is data acquired by converting the program source of the corresponding program into machine language. The program code 1401 is stored in the code segment described with reference to FIG. 9. The data 1402 is data used by the corresponding process or a thread belonging to the corresponding process. The data 1402 is stored in the data segment, the heap segment, and the stack segment described with reference to FIG. 9.

The OS data area 1308 includes a process list 1403, a thread list 1404, a load amount 1405, and a communication state 1406. The process list 1403 is a list of processes executed by the CPU 102 thereof. The thread list 1404 is a list of threads executed by the CPU 102 thereof. The load amount 1405 is a load amount of the communication apparatus 101 thereof. The communication state 1406 stores the information of the communication state between the communication apparatus 101 thereof and the other communication apparatus 101.

For example, taking as an example the values of the fields of the OS data area 1308 in the communication apparatus 101#0 in FIG. 12, the process list field stores a list including two processes, i.e., the process A and the process B. The thread list field stores a list including four threads, i.e., the thread A-1, the thread A-2, the thread B-1, and the thread B-2. The load amount field stores a numeric value of 65 M. The communication state field stores information that indicates the wired connection state.

The communication system 100 sets the load distribution by using the functional units depicted in FIG. 13 and the data depicted in FIG. 14. Flowcharts of processing by the functional units depicted in FIG. 13 will hereinafter be described with reference to FIGS. 15 to 22. Although a CPU executing the flowcharts of FIGS. 15 to 22 is assumed to be the CPU 102#0 in the communication apparatus 101#0 in this description, the CPU 102 in the other communication apparatus 101 executes equivalent processing.

Figure 15:
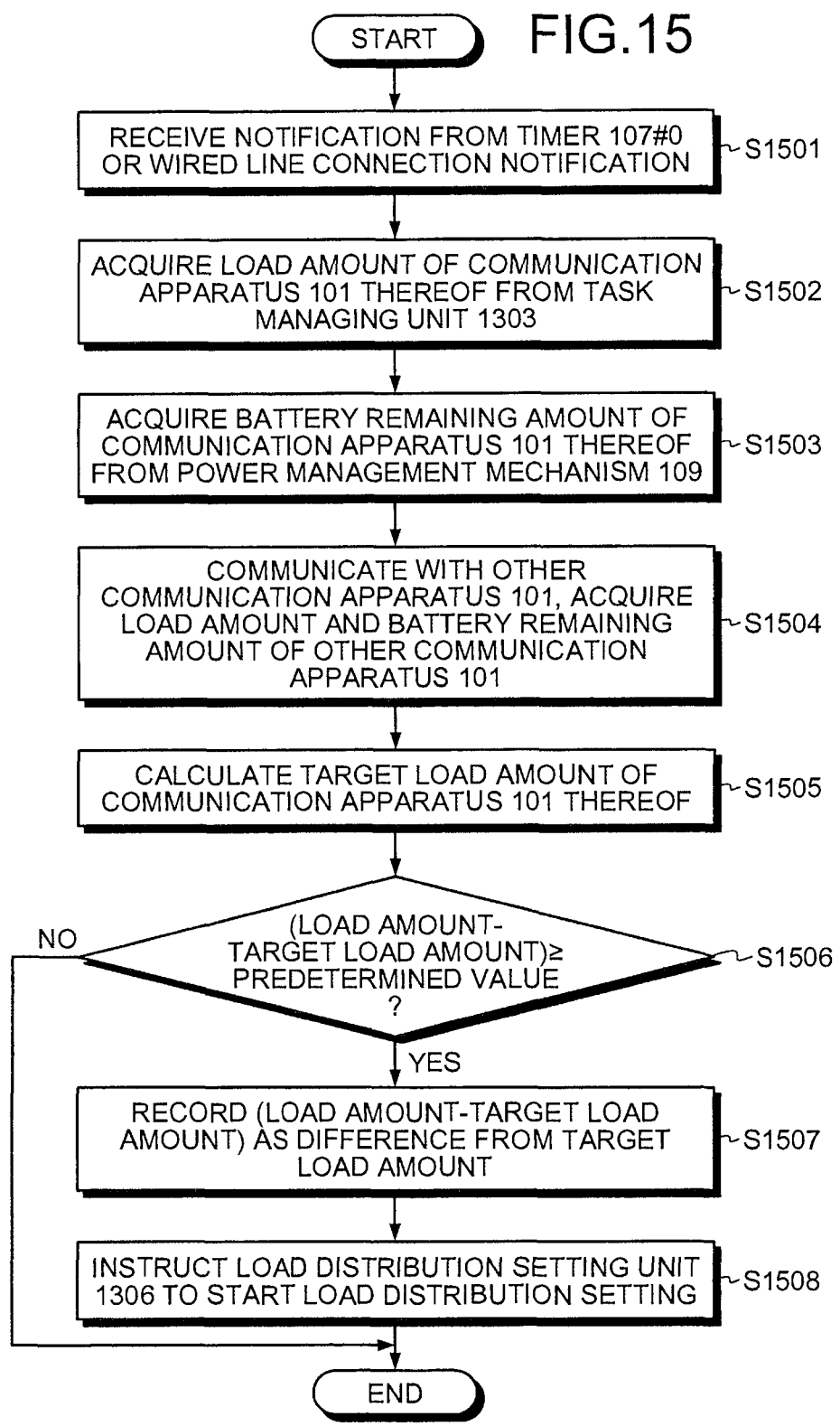
FIG. 15 is a flowchart of processing by a load monitoring unit 1304.

FIG. 15 is a flowchart of processing by the load monitoring unit 1304. The CPU 102#0 receives notification from the timer 107#0 or wired line connection notification (step S1501). After receiving the notification, the CPU 102#0 acquires the load amount of the communication apparatus 101 thereof from the task managing unit 1303 (step S1502). After acquiring the load amount, the CPU 102#0 acquires the battery remaining amount of the communication apparatus 101 thereof from the power management mechanism 109 (step S1503). After acquiring the battery remaining amount, the CPU 102#0 communicates with the other communication apparatus 101 to acquire a load amount and a battery remaining amount of the other communication apparatus 101 (step S1504).

After acquiring the load amount and the battery remaining amount of the other communication apparatus 101, the CPU 102#0 calculates the target load amount of the communication apparatus 101 thereof (step S1505). The CPU 102#0 uses, for example, Equation (3) as a calculation method for the target load amount based on the battery remaining amount.

$$\text{the target load amount} = (\text{the load amount of the communication apparatus 101 thereof} + \text{the load amount of the other communication apparatus 101}) * \text{the battery remaining amount of the communication apparatus 101 thereof}/(\text{the battery remaining amount of the communication apparatus 101 thereof} + \text{the battery remaining amount of the other communication apparatus 101}) \quad (3)$$

After the calculation of the target load amount, the CPU 102#0 determines whether the load amount−the target load amount is greater than or equal to a predetermined value (step S1506). If the load amount−the target load amount is greater than or equal to the predetermined value (step S1506: YES), the CPU 102#0 records the load amount−the target load amount as a difference from the target load amount (step S1507). After recording, the CPU 102#0 instructs the load distribution setting unit 1306 to start the load distribution setting (step S1508) and terminates the processing by the load monitoring unit 1304. If the load amount−the target load amount is smaller than the predetermined value (step S1506: NO), the CPU 102#0 terminates the processing by the load monitoring unit 1304.

Figure 16:
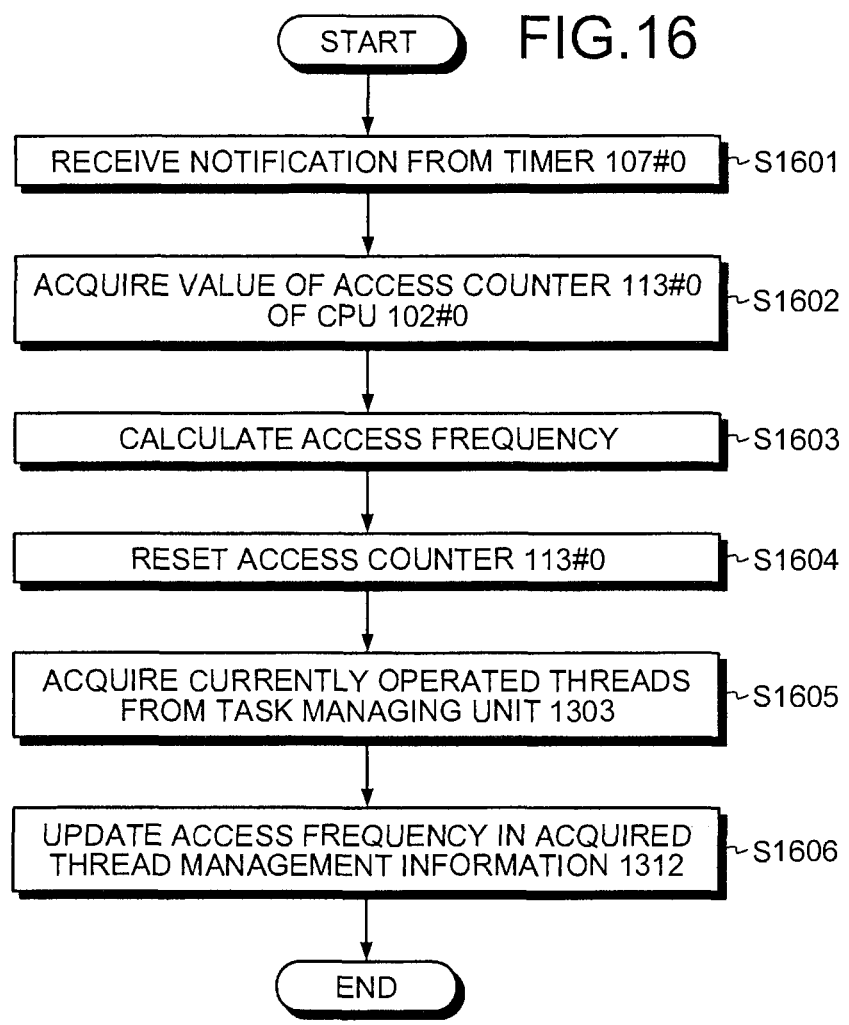
FIG. 16 is a flowchart of processing by an access monitoring unit 1302.

FIG. 16 is a flowchart of processing by the access monitoring unit 1302. The CPU 102#0 receives notification from the timer 107#0 (step S1601) and acquires the value of the access counter 113#0 of the CPU 102#0 (step S1602). After acquiring the value, the CPU 102#0 calculates the access frequency (step S1603). For example, the CPU 102#0 uses the access frequency=(the value of the access counter 113/the notification interval of the timer 107) as a calculation method for the access frequency.

After calculating the access frequency, the CPU 102#0 resets the access counter 113#0 (step S1604). After the reset, the CPU 102#0 acquires currently operated threads from the task managing unit 1303 (step S1605). After the acquisition, the CPU 102#0 updates the access frequency in the thread management information 1312 corresponding to the acquired threads (step S1606).

Figure 17:
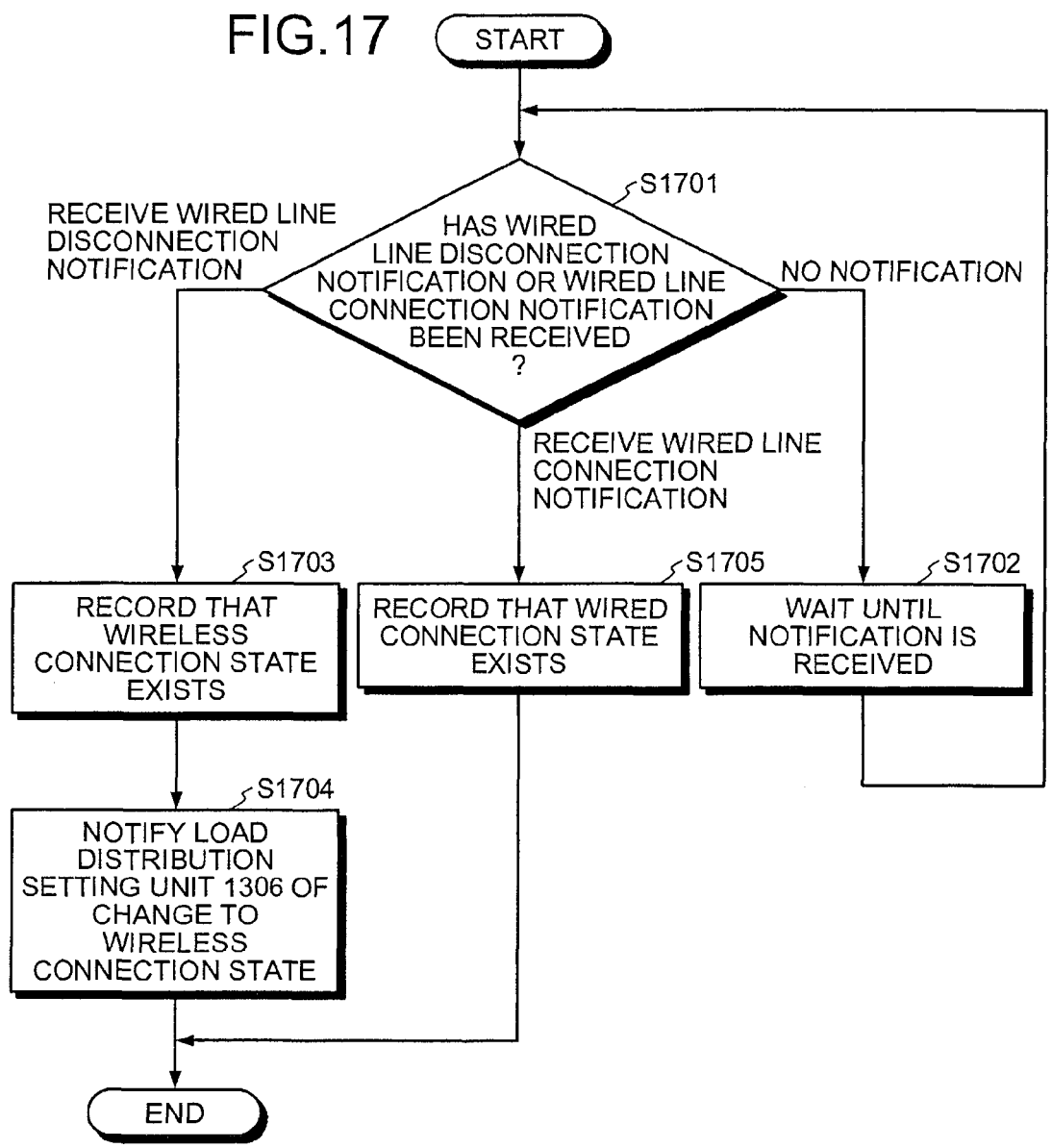
FIG. 17 is a flowchart of processing by a communication state monitoring unit 1305.

FIG. 17 is a flowchart of processing by the communication state monitoring unit 1305. The CPU 102#0 determines whether wired line disconnection notification or wired line connection notification has been received (step S1701). If the notification has not been received (step S1701: NO NOTIFICATION), the CPU 102#0 waits until notification is received (step S1702) and goes to the operation at step S1701 again.

If the wired line disconnection notification is received (step S1701: RECEIVE WIRED LINE DISCONNECTION NOTIFICATION), the CPU 102#0 records that the wireless connection state exists (step S1703). After the recording, the CPU 102#0 notifies the load distribution setting unit 1306 of the change to the wireless connection state (step S1704) and terminates the processing by the communication state monitoring unit 1305. The load distribution setting unit 1306 receiving the change to the wireless connection state executes a switching process of switching from the second load distribution to the first load distribution. Details of the switching process will be described later with reference to FIG. 22.

If a wired line connection notification has been received (step S1701: RECEIVE WIRED LINE CONNECTION NOTIFICATION), the CPU 102#0 records that the wired connection state exists (step S1705) and terminates the processing by the communication state monitoring unit 1305.

Figure 18:
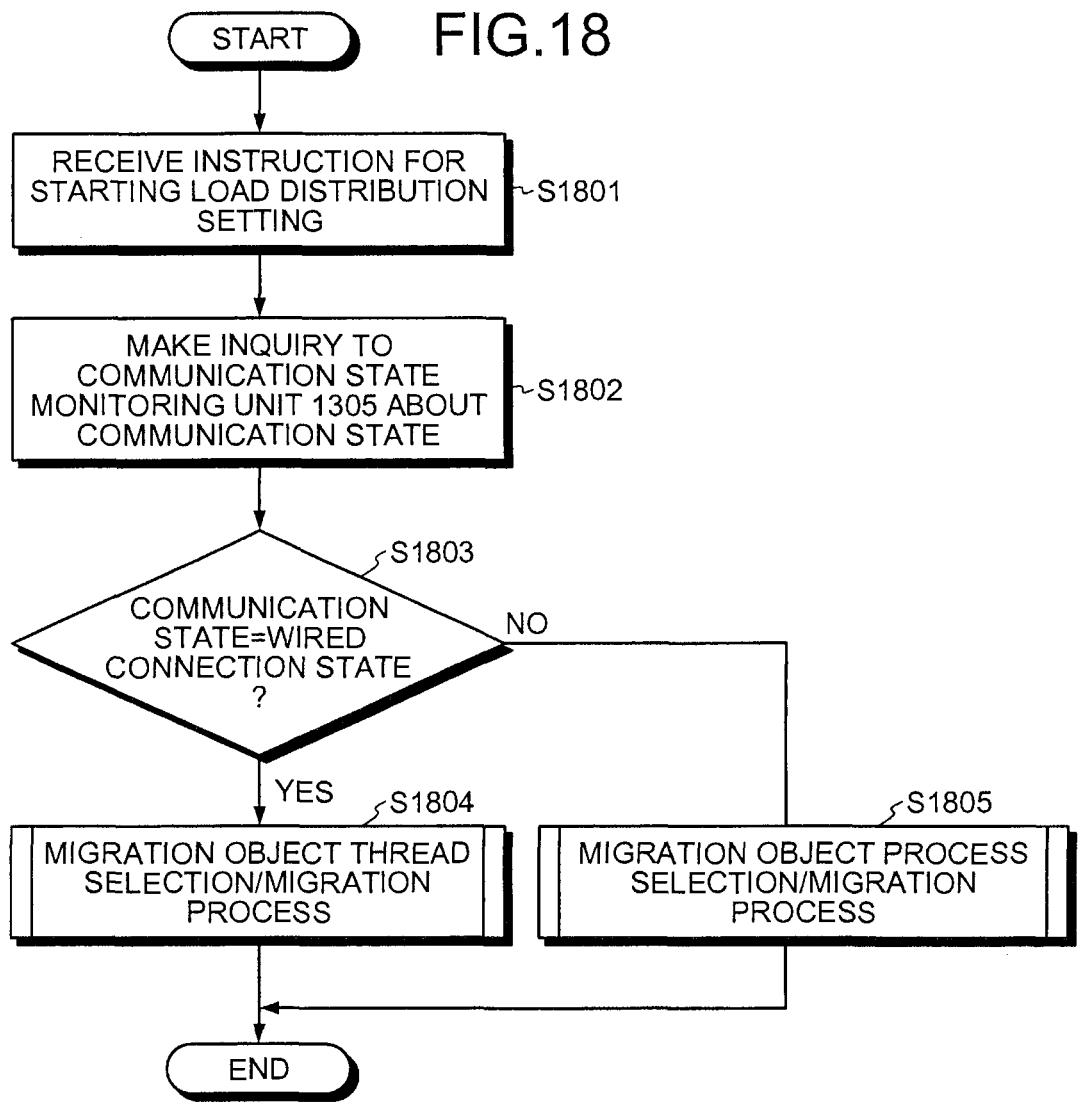
FIG. 18 is a flowchart of a load distribution setting process by a load distribution setting unit 1306.

FIG. 18 is a flowchart of a load distribution setting process by the load distribution setting unit 1306. The CPU 102#0 receives an instruction for starting the load distribution setting (step S1801) and makes an inquiry to the communication state monitoring unit 1305 about the communication state (step S1802). After the inquiry, the CPU 102#0 determines whether the communication state is the wired connection state (step S1803). In the case of the wired connection state (step S1803: YES), the CPU 102#0 executes a migration object thread selection/migration process (step S1804) and terminates the load distribution setting process. Details of the migration object thread selection/migration process will be described with reference to FIGS. 19 and 20. In the case of the wireless connection state (step S1803: NO), the CPU 102#0 executes a migration object process selection/migration process (step S1805). Details of the migration object process selection/migration process will be described later with reference to FIG. 21.

Figure 19:
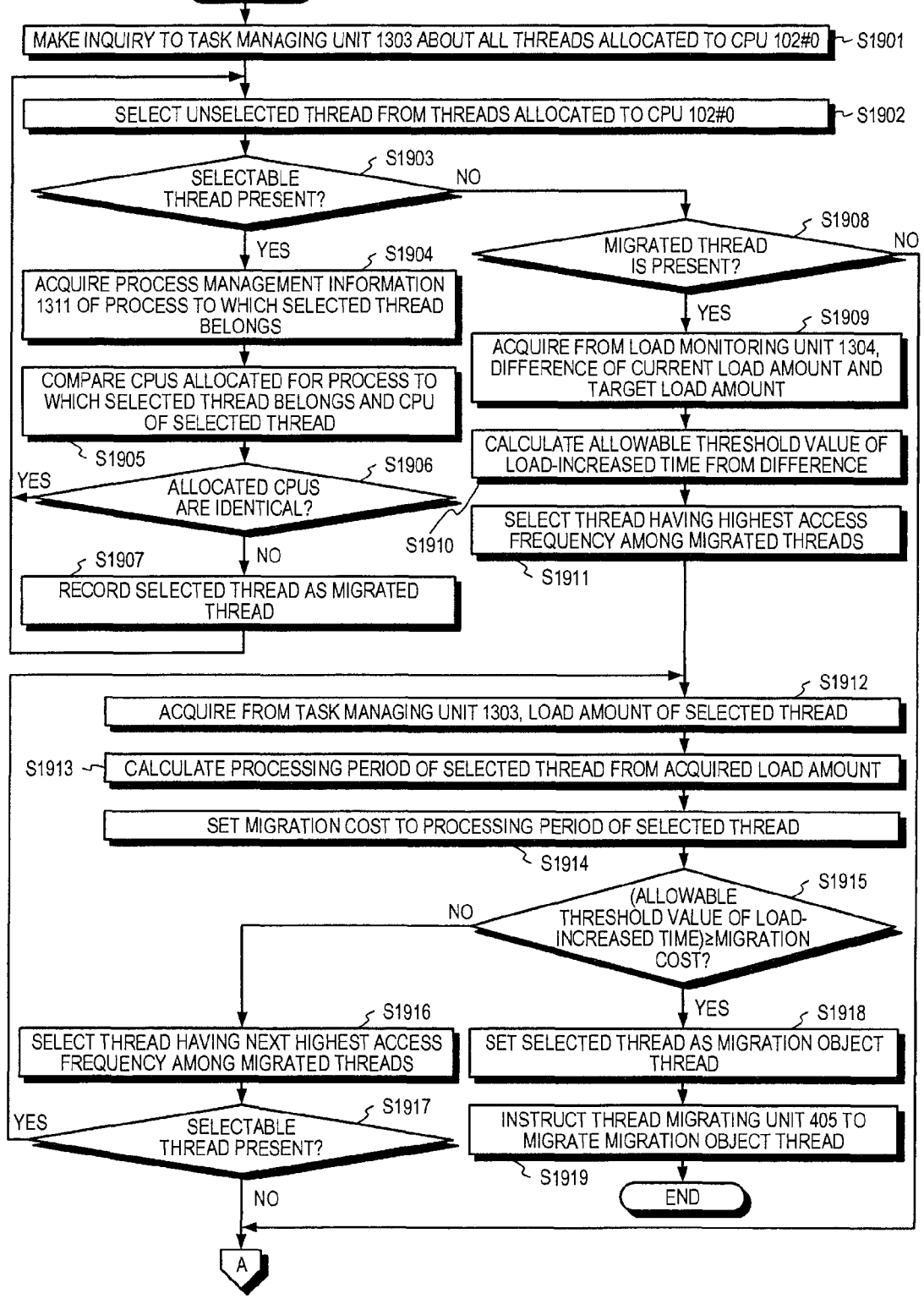
FIG. 19 is a flowchart (part one) of a migration object thread selection/migration process by the load distribution setting unit 1306.

FIG. 19 is a flowchart (part one) of the migration object thread selection/migration process by the load distribution setting unit 1306. The flowchart depicted in FIG. 19 describes a process of searching and selecting a thread migrated in the past as the migration object thread, if the thread migrated in the past exists.

The CPU 102#0 makes an inquiry to the task managing unit 1303 about all the threads allocated to the CPU 102#0 (step S1901). The task managing unit 1303 refers to the thread list 1404 having description of information of all the threads allocated to the CPU 102#0 to respond to the inquiry.

After the inquiry, the CPU 102#0 selects an unselected thread from the threads allocated to the CPU 102#0 (step S1902). After the selection, the CPU 102#0 determines whether a selectable thread is present (step S1903). If a selectable thread is present (step S1903: YES), the CPU 102#0 acquires the process management information 1311 of the process to which the selected thread belongs (step S1904). After the acquisition, the CPU 102#0 compares the CPUs allocated for the process to which the selected thread belongs and the CPU allocated for the selected thread (step S1905).

From the comparison result, the CPU 102#0 determines whether the allocated CPUs are identical (step S1906). If the allocated CPUs are not identical (step S1906: NO), the CPU 102#0 records the selected thread as a migrated thread (step S1907). After the recording, the CPU 102#0 goes to the operation at step S1902. If the allocated CPUs are identical (step S1906: YES), the CPU 102#0 goes to the operation at step S1902.

If all the threads have been selected and no selectable thread is present (step S1903: NO), the CPU 102#0 determines whether a migrated thread is present (step S1908). If a migrated thread is present (step S1908: YES), the CPU 102#0 acquires from the load monitoring unit 1304, the difference of the current load amount and the target load amount (step S1909). After the acquisition, the CPU 102#0 calculates an allowable threshold value of load-increased time from the difference of the current load amount and the target load amount (step S1910).

After the calculation, the CPU 102#0 selects a thread having the highest access frequency among migrated threads (step S1911). After the selection, the CPU 102#0 acquires from the task managing unit 1303, the load amount of the selected thread (step S1912). After the acquisition, the CPU 102#0 calculates a processing period of the selected thread from the acquired load amount (step S1913). After the calculation, the CPU 102#0 sets the migration cost to the processing period of the selected thread (step S1914) and determines whether the allowable threshold value of the load-increased time is greater than or equal to the migration cost (step S1915).

If the allowable threshold value of load-increased time is greater than or equal to the migration cost (step S1915: YES), the CPU 102#0 sets the selected thread as the migration object thread (step S1918). After the setting, the CPU 102#0 instructs the thread migrating unit 405 to migrate the migration object thread (step S1919) and terminates the migration object thread selection/migration process.

The migration method of the migration object thread is a method of returning to the source CPU 102, a thread migrated by the second migration method in the past. In this case, the source CPU 120 has the conversion table 902 of the process to which the migrated thread belongs to and therefore, it is not necessary to execute the process related to the conversion table 902. If the returning of the migrated thread leads to the absence of a thread in the process to which the thread migrated from the destination CPU 102 belongs to, the conversion table 902 present in the destination RAM 104 and corresponding to the process may be deleted.

If the allowable threshold value of load-increased time is less than the migration cost (step S1915: NO), the CPU 102#0 selects a thread having the next highest access frequency among the migrated threads (step S1916). After the selection, the CPU 102#0 determines whether a selectable thread is present (step S1917). If a selectable thread is present (step S1917: YES), the CPU 102#0 goes to the operation at step S1912. If no selectable thread is present (step S1917: NO) or if no migrated thread is present (step S1908: NO), the CPU 102#0 goes to a flowchart depicted in FIG. 20.

Figure 20:
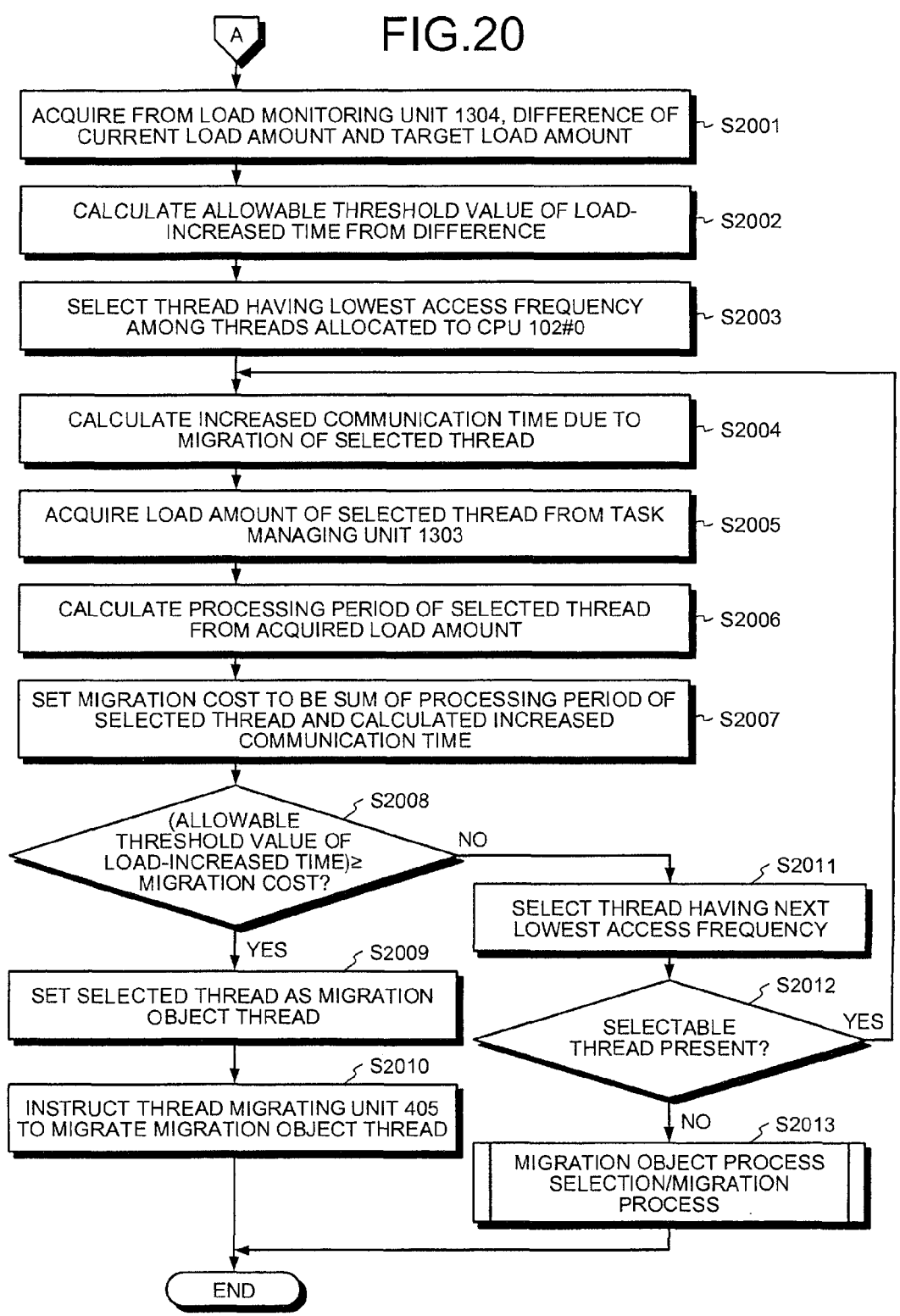
FIG. 20 is a flowchart (part two) of the migration object thread selection/migration process by the load distribution setting unit 1306.

FIG. 20 is a flowchart (part two) of the migration object thread selection/migration process by the load distribution setting unit 1306. The flowchart depicted in FIG. 20 describes a process of selecting and migrating a migration object thread among currently executed threads if no thread migrated in the past exists.

The CPU 102#0 acquires from the load monitoring unit 1304, the difference of the current load amount and the target load amount (step S2001). After the acquisition, the CPU 102#0 calculates an allowable threshold value of the load-increased time from the difference of the current load amount and the target load amount (step S2002). After the calculation, the CPU 102#0 selects the thread having the lowest access frequency among the threads allocated to the CPU 102#0 (step S2003). After the selection, the CPU 102#0 calculates the increased communication time due to migration of the selected thread (step S2004). With regard to the calculation method, the increased communication time can be calculated by Equation (2).

After the calculation, the CPU 102#0 acquires a load amount of the selected thread from the task managing unit 1303 (step S2005). After the acquisition, the CPU 102#0 calculates the processing period of the selected thread from the acquired load amount (step S2006). After the calculation, the CPU 102#0 sets the migration cost to be the sum of the processing period of the selected thread and the calculated increased communication time (step S2007).

After setting the migration cost, the CPU 102#0 determines whether the allowable threshold value of load-increased time is at least equal to the migration cost (step S2008). If the allowable threshold value of load-increased time is greater than or equal to the migration cost (step S2008: YES), the CPU 102#0 sets the selected thread as the migration object thread (step S2009). The CPU 102#0 then instructs the thread migrating unit 405 to migrate the migration object thread (step S2010) and terminates the migration object thread selection/migration process.

With regard to the migration method of migrating the migration object thread, the thread is migrated to the destination CPU 102 by the second migration method. When migrating the migration object thread, the CPU 102#0 may check allocated CPUs of the remaining threads belonging to the same process as the migration object tread. As a result of checking, if the allocated CPU of all the remaining threads is the CPU 102, the CPU 102#0 may migrate to the destination CPU 102 by the first migration method, the process to which the migration object thread belongs.

If the allowable threshold value of load-increased time is less than the migration cost (step S2008: NO), the CPU 102#0 selects a thread having the next lowest access frequency (step S2011). The CPU 102#0 determines whether a selectable thread is present (step S2012). If a selectable thread is present (step S2012: YES), the CPU 102#0 goes to the operation at step S2004.

If all the threads allocated to the CPU 102#0 have been selected and no selectable thread is present (step S2012: NO), the CPU 102#0 executes the migration object process selection/migration process (step S2013) and terminates the migration object thread selection/migration process. The route of step S2012: NO indicates absence of a thread that can reduce the load if the thread is migrated in the wired connection state.

Figure 21:
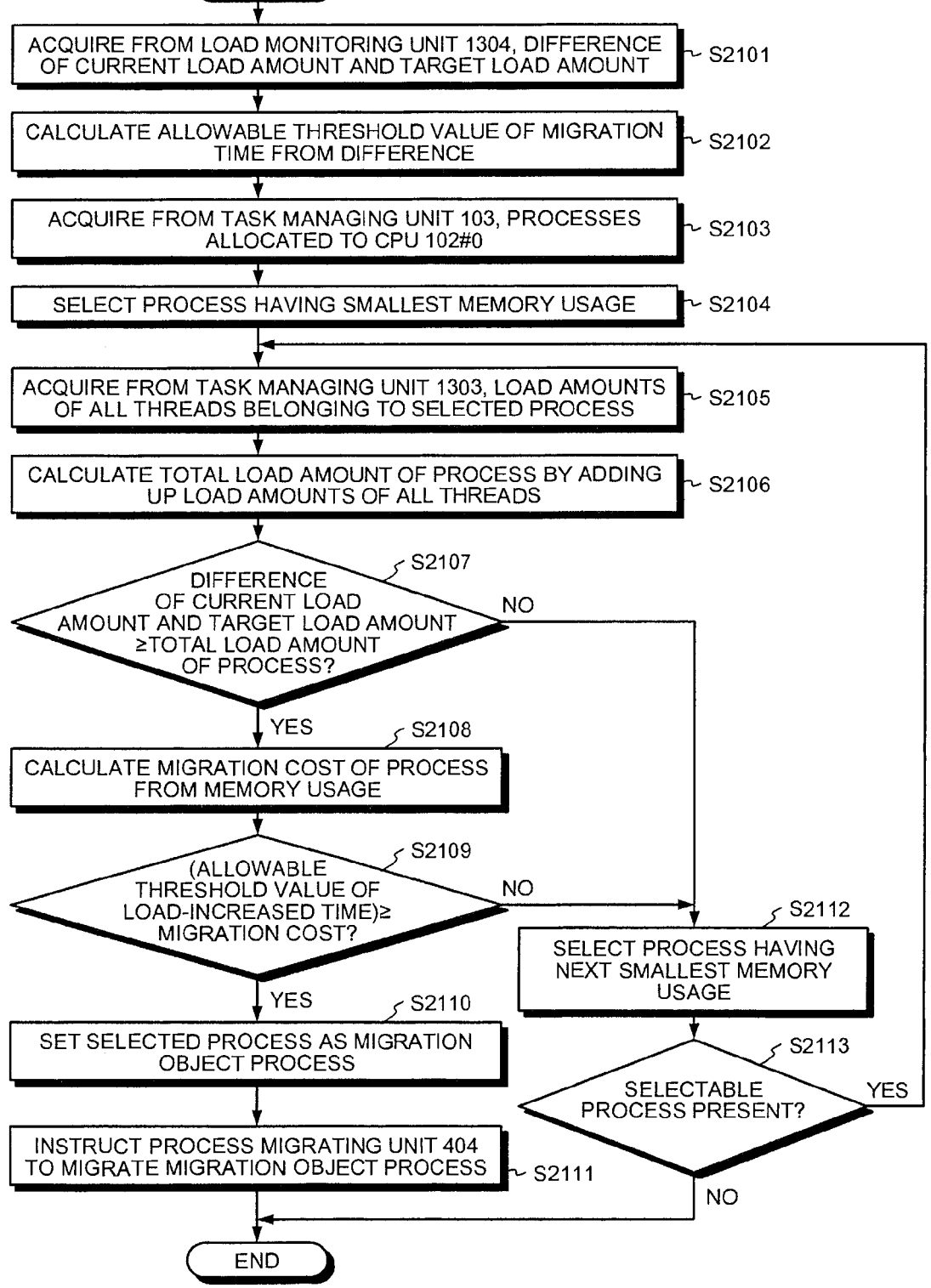
FIG. 21 is a flowchart of a migration object process selection/migration process by the load distribution setting unit 1306.

FIG. 21 is a flowchart of the migration object process selection/migration process by the load distribution setting unit 1306. The flowchart depicted in FIG. 21 is executed if no suitable thread is found in the wired connection state of the migration object process selection/migration process or in the case of the wireless connection state.

The CPU 102#0 acquires from the load monitoring unit 1304, the difference of the current load amount and the target load amount (step S2101). After the acquisition, the CPU 102#0 calculates an allowable threshold value of migration time from the difference of the current load amount and the target load amount (step S2102). After the calculation, the CPU 102#0 acquires from the task managing unit 103, the processes allocated to the CPU 102#0 (step S2103). After the acquisition, the CPU 102#0 selects the process having the smallest memory usage (step S2104).

After the selection, the CPU 102#0 acquires from the task managing unit 1303, the load amounts of all the threads belonging to the selected process (step S2105). After the acquisition, the CPU 102#0 calculates the total load amount of the process by adding up the load amounts of all the threads (step S2106). After the calculation, the CPU 102#0 determines whether the difference of the current load amount and the target load amount is at least equal to the total load amount of the process (step S2107). If a difference is greater than or equal to the total load amount of the process (step S2107: YES), the CPU 102#0 calculates the migration cost of the process from the memory usage (step S2108). With regard to the calculation method, the migration cost can be calculated by Equation (1).

After the calculation, the CPU 102#0 determines whether the allowable threshold value of migration time is at least equal to the migration cost (step S2109). If the allowable threshold value of migration time is greater than or equal to the migration cost (step S2109: YES), the CPU 102#0 sets the selected process as the migration object process (step S2110). After the setting, the CPU 102#0 instructs the process migrating unit 404 to migrate the migration object process (step S2111) and terminates the migration object process selection/migration process. With regard to the migration method of the migration object process, the migration object process is migrated by the first migration method.

If the difference of the current load amount and the target load amount is less than the total load amount of the process (step S2107: NO), the CPU 102#0 selects a process having the next smallest memory usage (step S2112). If the allowable threshold value of migration time is less than the migration cost (step S2109: NO), the CPU 102#0 also goes to the operation at step S2112. The CPU 102#0 determines whether a selectable process is present (step S2113). If a selectable process is present (step S2113: YES), the CPU 102#0 goes to the operation at step S2105. If all the processes allocated to the CPU 102#0 have been selected and no selectable process is present (step S2113: NO), the CPU 102#0 terminates the migration object process selection/migration process.

Figure 22:
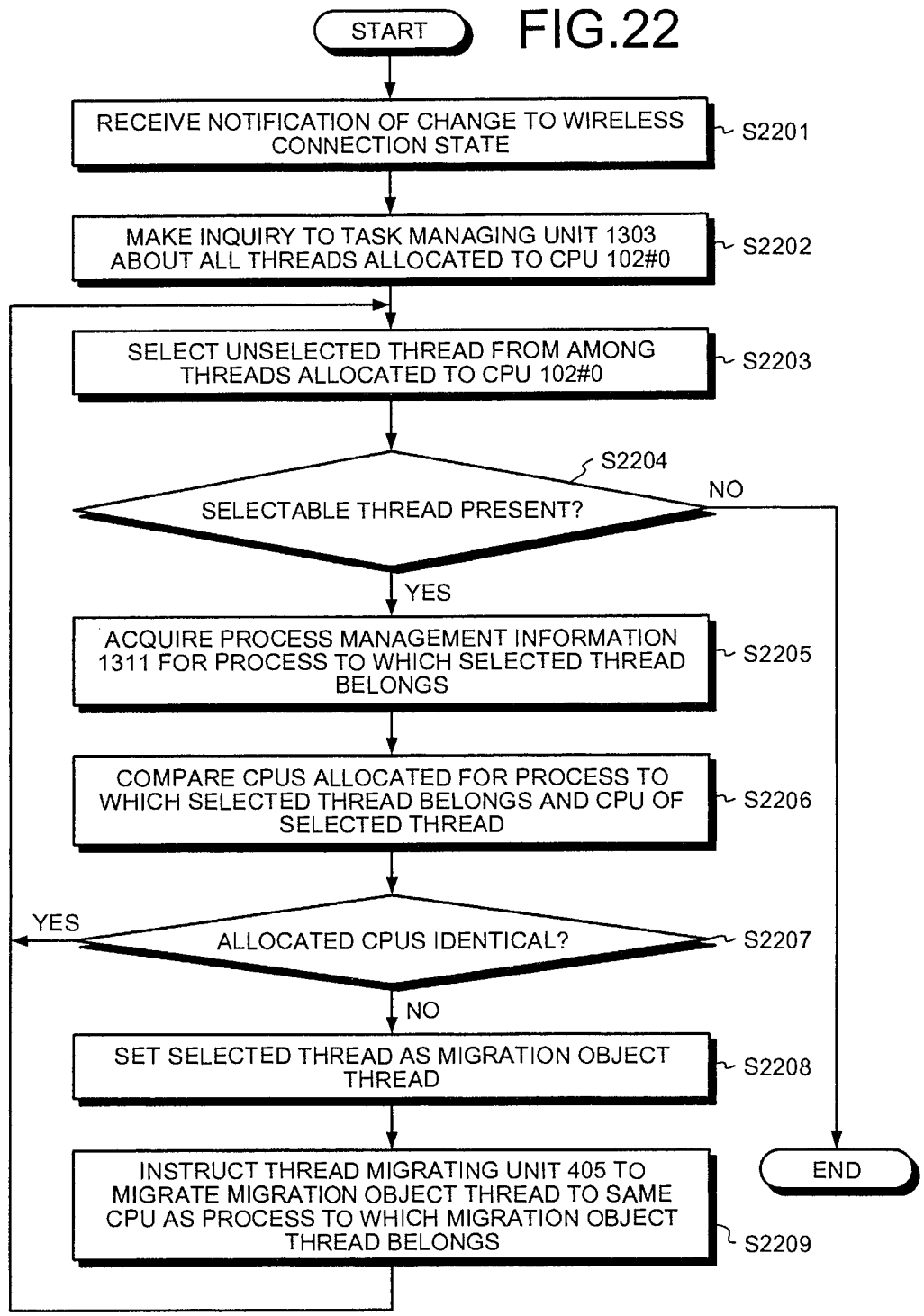
FIG. 22 is a flowchart of a switching process from the second load distribution to the first load distribution by the load distribution setting unit 1306.

FIG. 22 is a flowchart of the switching process from the second load distribution to the first load distribution by the load distribution setting unit 1306 when a shift is made from the wired communication to the wireless communication. The CPU 102#0 receives notification of a change to the wireless connection state (step S2201). In response, the CPU 102#0 makes an inquiry to the task managing unit 1303 about all the threads allocated to the CPU 102#0 (step S2202). After the inquiry, the CPU 102#0 selects an unselected thread from among the threads allocated to the CPU 102#0 (step S2203). After the selection, the CPU 102#0 determines whether a selectable thread is present (step S2204).

If a selectable thread is present (step S2204: YES), the CPU 102#0 acquires the process management information 1311 for the process to which the selected thread belongs (step S2205). After the acquisition, the CPU 102#0 compares the CPUs allocated for the process to which the selected thread belongs and the CPU of the selected thread (step S2206). From the comparison result, the CPU 102#0 determines whether the allocated CPUs are identical (step S2207). If the allocated CPUs are not identical (step S2207: NO), the CPU 102#0 sets the selected thread as the migration object thread (step S2208).

After the setting, the CPU 102#0 instructs the thread migrating unit 405 to migrate the migration object thread to the same CPU as the process to which the migration object thread belongs (step S2209). After the instruction, the CPU 102#0 goes to the operation at step S2203. If the allocated CPUs are identical (step S2207: YES), the CPU 102#0 goes to the operation at step S2203. If all the threads allocated to the CPU 102#0 have been selected and no selectable thread is present (step S2204: NO), the CPU 102#0 terminates the switching process.

The flowcharts of FIGS. 15 to 22 are based on the assumption that two communication apparatuses 101 are present. Even if the three or more communication apparatuses 101 are present, the load distribution setting is executed one-on-one between the communication apparatuses 101. This can be accommodated by changing the determination of returning the migrated thread in the flowcharts of FIGS. 19 and 22 such that threads are limited to those migrated from the current target communication apparatus 101 by checking the CPU to which the process is allocated. For example, in the processes of step S1901 and step S2202, the process of "making an inquiry about all the threads" is replaced with a process of "making an inquiry about threads of processes of an allocated CPU subject to the load distribution setting".

When three or more communication apparatuses 101 present, a process is added to the load monitoring unit 1304 as described with reference to FIG. 23, to determine the communication apparatus 101 subject to the load distribution process among the communication apparatuses 101. A flowchart depicted in FIG. 23 includes a process in which the communication apparatus 101 having a larger battery remaining amount is preferentially subject to the load distribution setting.

Figure 23:
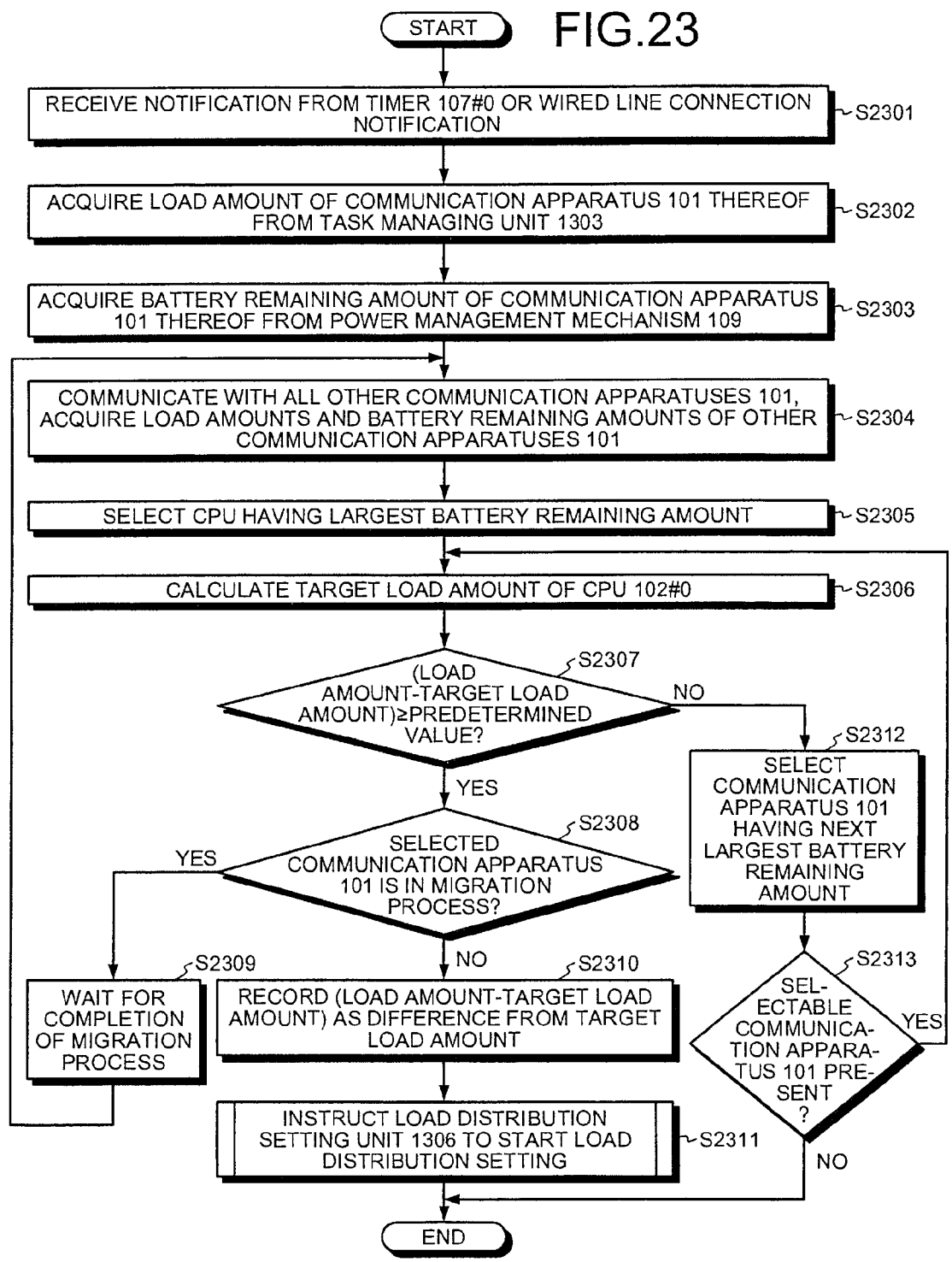
FIG. 23 is a flowchart of processing by the load monitoring unit 1304 when three or more communication apparatuses 101 are present.

FIG. 23 is a flowchart of processing by the load monitoring unit 1304 when three or more communication apparatuses 101 are present. Although the CPU executing the flowchart of FIG. 23 is assumed to be the CPU 102#0 in the communication apparatus 101#0 in this description, the CPU 102 in the other communication apparatuses 101 executes equivalent processing. Steps S2301 to S2303 in FIG. 23 are equivalent to the operations at steps S1501 to S1503 and will not be described.

After the operation at step S2303 is completed, the CPU 102#0 communicates with all the other communication apparatuses 101 to acquire the load amounts and the battery remaining amounts of the other communication apparatuses 101 (step S2304). After the acquisition, the CPU 102#0 selects the CPU having the largest battery remaining amount (step S2305). The CPU selected at step S2305 is defined as a candidate of the communication apparatuses 101 subject to the load distribution setting. After the selection, the CPU 102#0 calculates the target load amount of the CPU 102#0 (step S2306). After the calculation, the CPU 102#0 determines whether the load amount–the target load amount is at least equal to a predetermined value (step S2307).

If the load amount–the target load amount is greater than or equal to a predetermined value (step S2307: YES), the CPU 102#0 determines whether the selected communication apparatus 101 is in a migration process (step S2308). If the communication apparatus 101 is in a migration process (step S2308: YES), the CPU 102#0 waits for the completion of the migration process (step S2309) and, after the migration process is completed, the CPU 102#0 goes to the operation at step S2304. Since the completion of migration changes the load amount, the CPU 102#0 executes step S2304 to check the change in load amount due to the migration and thereby, determines the target communication apparatus 101.

If the communication apparatus 101 is not in a migration process (step S2308: NO), the CPU 102#0 records a value of the load amount–the target load amount as the difference of the current load amount and the target load amount (step S2310). After the recording, the CPU 102#0 instructs the load distribution setting unit 1306 to start the load distribution setting (step S2311), and terminates the process of the load monitoring unit 1304. If the load amount–the target load amount is less than the predetermined value (step S2307: NO), the CPU 102#0 selects a communication apparatus 101 having the next largest battery remaining amount (step S2312).

After the selection, the CPU 102#0 determines whether a selectable communication apparatus 101 is present (step S2313). If a selectable communication apparatus 101 is present (step S2313: YES), the CPU 102#0 goes to the operation at step S2306. If all the communication apparatuses 101 have been selected and no selectable communication apparatus 101 is present (step S2313: NO), the CPU 102#0 terminates the process of the load monitoring unit 1304.

As described above, according to the communication apparatus, the load distribution method, and the recording medium of the first embodiment, depending on the communication state of the communication system, the first load distribution is executed in the wireless connection state and the second load distribution causing larger communication traffic and more even loads among apparatuses is executed in the high-speed, wired connection state. As a result, the communication system can execute load distribution suitable for the communication state, thereby improving the processing efficiency. The load balance in the communication system can be made more even to reduce power consumption.

The communication system may transfer program code and data of a process executed by a CPU of a first communication apparatus to a second communication apparatus in the first load distribution. This enables the communication system to perform migration based on process and therefore to implement the load distribution based on process.

The communication system may transfer a thread included in a process executed by the CPU of the first communication apparatus to the second communication apparatus. This enables the communication system to perform migration based on thread and therefore to implement the load distribution based on thread.

The communication system may determine to execute the load distribution when the difference between the load amount of the first communication apparatus and the load amount of the second communication apparatus is greater than or equal to a predetermined value, enabling the communication system to prevent excessive execution of the load distribution.

The communication system may determine whether the load distribution is executed, based on notification from a timer. This enables the communication system to periodically execute the load distribution and to prevent excessive execution of the load distribution.

The communication system may select a migration object process migrated to the second communication apparatus based on a transfer time from the memory of the first communication apparatus to the memory of the second communication apparatus. Some processes have a smaller load amount and greater memory usage, and the migration of such a process causes higher migration cost and deterioration in processing efficiency of the communication system. Therefore, the determination of the migration object process based on a memory transfer time enables the communication system to improve the load balance and reduce power consumption while minimizing the load amount associated with the migration.

The communication system may select a migration object thread migrated to the second communication apparatus based on the access frequency to the memory of the first communication apparatus or past thread transfer history. Since the load distribution based on thread increases communication traffic, a migration object thread minimizing the communication traffic can be selected to improve the load balance while minimizing the load amount associated with the migration.

If a communication apparatus with an increased load amount has a thread migrated in the past from the other communication apparatus, the communication traffic between the communication apparatuses is reduced by returning the migrated thread. Therefore, the communication system can return the thread migrated in the past to improve the load balance while reducing the load amount.

The process migrating unit 404 according to the first embodiment copies the entire process data area 1307 from the source RAM 104 to the destination RAM 104. However, the destination CPU 102 may retain the same data in the destination storage area as a portion of data in the process data area 1307. In this case, the communication traffic associated with the process migration process can be reduced by not copying data in the process data area 1307 already retained in the destination CPU 102. The operation of the process migrating unit 404 according to the second embodiment will hereinafter be described with reference to FIGS. 24 to 26.

The hardware of the communication system 100 according to the second embodiment is equivalent to the hardware of the communication system 100 according to the first embodiment and the functions of the communication system 100 according to the second embodiment are substantially equivalent to the functions of the communication system 100 according to the first embodiment. The operation of the process migrating unit 404 having a function different from the first embodiment will hereinafter be described.

Figure 24:
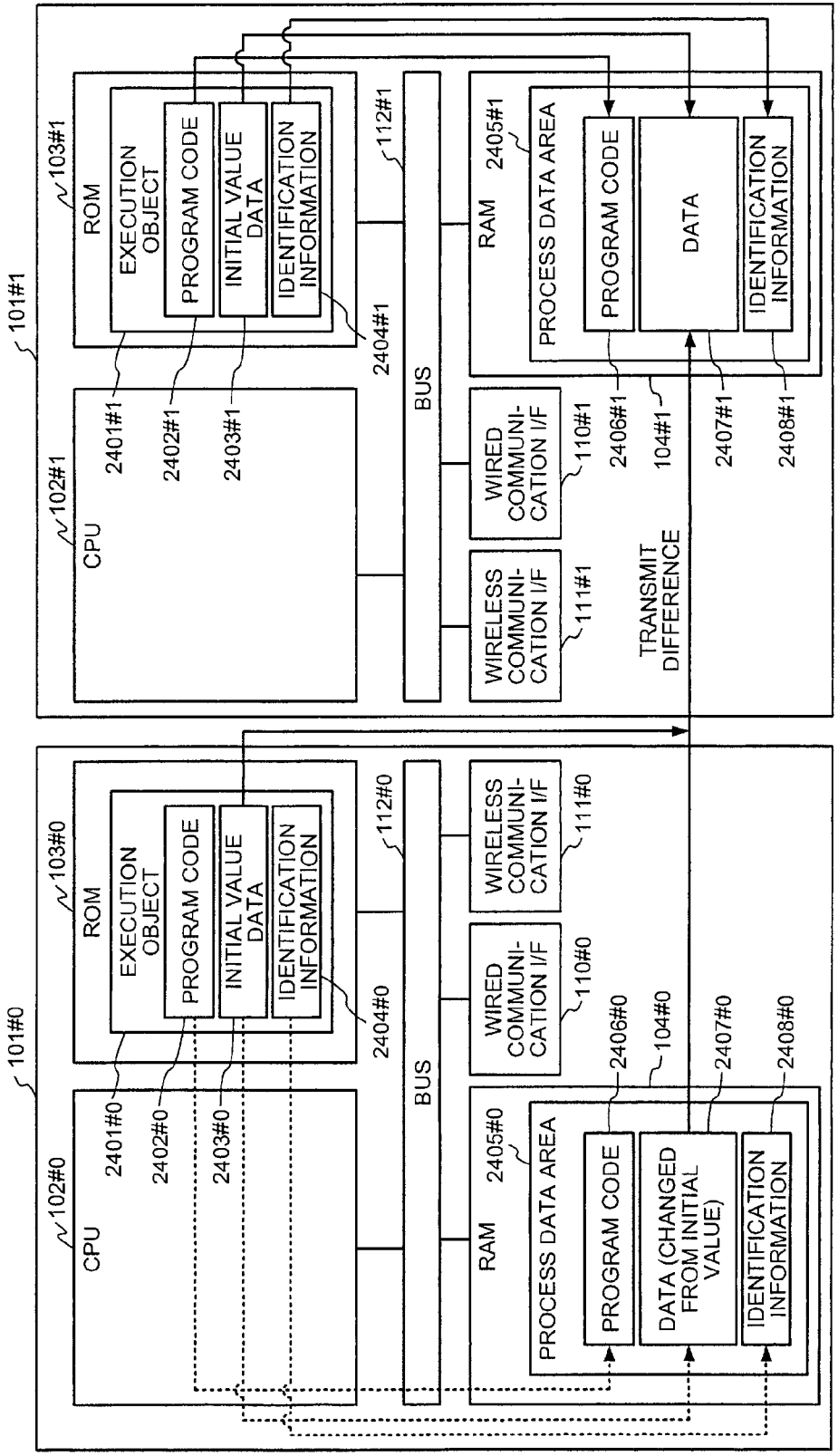
FIG. 24 is an explanatory view of operation in migration of a migration object process in a second embodiment.

FIG. 24 is an explanatory view of operation in the migration of a migration object process in the second embodiment. It is assumed that the communication system 100 depicted in FIG. 24 migrates to the communication apparatus 101#1, a migration object process under execution in the communication apparatus 101#0.

The ROM 103#0 stores an execution object 2401#0 that is a generating source of the migration object process. The execution object 2401#0 stores program code 2402#0, initial value data 2403#0, and identification information 2404#0. The program code 2402#0 is data acquired by converting the program source of the migration object process into machine language. The initial value data 2403#0 is an initial value of data used by the migration object process or a thread belonging to the migration object process. It is assumed in FIG. 24 that the ROM 103#1 stores an execution object 2401#1 that is the same execution object as the execution object 2401#0.

The identification information 2404#0 is information uniquely identifying the execution object 2401. If the program source of the migration object process is changed by a designer, etc., and a build tool then builds and regenerates the execution object 2401, the identification information 2404#0 is set to have a value different from the value before changing the program source. Therefore, it can be established that the execution object 2401 having equivalent identification information 2404 has the same contents, and a determination can be made on whether the same data are retained, which characterizes the second embodiment.

A specific example of the identification information 2404 may be data acquired by combining the name of the execution object 2401 and an ID having a value incremented each time a build is performed. Another specific example of the identification information 2404 may be data acquired by combining the name of a migration object process and a hash value generated from the program code 2402 and the initial value data 2403.

It is assumed that, in the case of the example of combining a hash value, the communication apparatus 101 downloads through the wireless communication I/F 111, etc., the execution object 2401 without the identification information 2404. In this case, the communication apparatus 101 may refer to the downloaded execution object 2401 to generate a hash value, thereby generating the identification information 2404. This enables the communication system 100 to apply the reduction in communication traffic according to the second embodiment even to an execution object 2401 that does not have identification information 2404.

The communication apparatus 101#0 loads the execution object 2401#0 at the time of activation of the migration object process and deploys a process data area 2405#0 on the RAM 104#0. The process data area 2405#0 stores program code 2406#0, data 2407#0, and identification information 2408#0. Although not depicted in FIG. 24, the process management information 1311 and the thread management information 1312 described in FIGS. 13 and 14 are also present in the process data area 2405#0.

The program code 2406#0 and the identification information 2408#0 are deployed as the same contents as the program code 2402#0 and the identification information 2404#0. The data 2407#0 is deployed as the same contents as the initial value data 2403#0 and, update and addition to the contents are performed in association with the migration object process.

If an instruction for migrating the migration object process is issued, the communication apparatus 101#0 does not have to transmit the program code 2406#0 to the communication apparatus 101#1 since the program code 2406#0 does not change during execution of the migration object process. The data 2407#0 may change during execution of the migration object process and therefore, the communication apparatus 101#0 generates the difference between the data 2407#0 and the initial value data 2403#0. After generating the difference, the communication apparatus 101#0 transmits the difference to the communication apparatus 101#1.

In a method of determining whether the execution object 2401#1 equivalent to the execution object 2401#0 is present in the communication apparatus 101#1, first, the communication apparatus 101#0 notifies the communication apparatus 101#1 of the identification information 2408#0. Subsequently, the communication apparatus 101#1 can search whether the execution object 2401#1 is present including the identification information 2408#1 identical to the identification information 2408#0 and thereby, determines whether the equivalent execution object 2401#1 is present.

The communication apparatus 101#1 receiving the difference, preliminarily deploys on the RAM 104#1, the execution object 2401#1 stored in the ROM 103#1. After receiving the difference, the communication apparatus 101#1 applies the difference to the data 2407#1.

The processing by the process migrating units 404 of the source and destination communication apparatuses 101 will hereinafter be described with reference to flowcharts depicted in FIGS. 25 and 26. In the description of the flowcharts depicted in FIGS. 25 and 26, it is assumed that the source communication apparatus 101 and the destination communication apparatus 101 are the communication apparatus 101#0 and the communication apparatus 101#1, respectively. During operation of the communication system 100, the communication apparatus 101#1 may act as the source communication apparatus 101 and the communication apparatus 101#0 may act as the destination communication apparatus 101.

FIG. 25 is a flowchart of a migration source process of the process migrating unit 404 in the source communication apparatus 101#0 in the second embodiment. The CPU 102#0 acquires the identification information 2408#0 of the migration object process from the RAM 104#0 (step S2501). After the acquisition, the CPU 102#0 notifies the communication apparatus 101#1 of the identification information 2408#0 and inquires whether the execution object 2401#1 identical to the execution object 2401#0 is present (step S2502). The CPU 102#0 determines from the response to the inquiry whether the execution object 2401#1 is present in the destination communication apparatus 101#1 (step S2503).

If the execution object 2401#1 is present (step S2503: YES), the CPU 102#0 determines whether the execution object 2401#0 is present in the source communication apparatus 101#0 (step S2504). If the execution object 2401#0 is present (step S2504: YES), the CPU 102#0 compares the initial value data 2403#0 of the execution object 2401#0 with the data 2407#0 and generates difference information (step S2505). After generating the difference information, the CPU 102#0 sets the difference information, the identification information 2408#0, the process management information 1311#0, and the thread management information 1312#0 as migration information (step S2506).

If the execution object 2401#0 is not present (step S2504: NO), the CPU 102#0 sets the data 2407#0, the identification information 2408#0, the process management information 1311#0, and the thread management information 1312#0 as migration information (step S2507). Specific examples of a case of an absence of the execution object 2401#0 include when a migration object process is once migrated and then returned again to the source communication apparatus 101 or when an execution object is loaded and the corresponding execution object is then updated.

If the identical execution object is not present (step S2503: NO), the CPU 102#0 sets the entire process data area 2405#0 as migration information (step S2508). After completion of steps S2506, S2507, and S2508, the CPU 102#0 transmits the set migration information to the destination communication apparatus 101#1 (step S2509) and after the transmission, the CPU 102#0 terminates the migration source process of the process migrating unit 404.

Since the application of the flowchart of FIG. 25 reduces communication traffic, the calculation method for the migration cost executed in the operation at step S2108 of FIG. 21 may be changed from a calculation method based on memory usage to a calculation method based on the actually transmitted data amount.

FIG. 26 is a flowchart of a migration destination process of the process migrating unit 404 in the destination communication apparatus 101#1 according to the second embodiment. The CPU 102#1 receives the migration information (step S2601). After the reception, the CPU 102#1 determines whether the migration information is for the entire process data area 2405#0 (step S2602). If the migration information is for the entire process data area 2405#0 (step S2602: YES), the CPU 102#1 deploys the migration information as the process data area 2405#1 on the RAM 104#1 (step S2603).

After the deployment, the CPU 102#1 registers the migration object process and the threads included in the migration object process into the OS 203#1 based on the deployed process management information 1311#1 and the thread management information 1312#1 (step S2608). After the registration, the CPU 102#1 terminates the migration destination process of the process migrating unit 404.

If the migration information is not for the entire process data area 2405#0 (step S2602: NO), the CPU 102#1 deploys on the RAM 104#1, the execution object 2401#1 corresponding to the identification information 2408#0 (step S2604). The CPU 102#1 may execute the operation at step S2604 in advance immediately after receiving the inquiry from the source communication apparatus 101#0 without waiting for the reception at step S2601. After the deployment, the CPU 102#1 determines whether the difference information is included in the migration information (step S2605).

If the difference information is not included (step S2605: NO), the CPU 102#1 overwrites the received data 2407#0 with the data 2407#1 (step S2606) and goes to the operation at step S2608. If the difference information is included (step S2605: YES), the CPU 102#1 applies the received difference information to the data 2407#1 (step S2607) and goes to the operation at step S2608.

As described above, according to the communication apparatus, the load distribution method, and the recording medium according to the second embodiment, when a process is migrated, if an execution object exists in the destination communication apparatus, data other than program code is transmitted. This enables the communication system to reduce communication traffic associated with execution of the load distribution and to enhance the processing efficiency.

If an execution object is present in the source communication apparatus, the communication system may generate the difference of a data portion and transmit the difference to the destination communication apparatus. This enables the communication system to further reduce communication traffic associated with execution of the load distribution and enhance the processing efficiency.

The communication system 100 according to the second embodiment uses the identification information 2408 to determine whether the execution object 2401 is present in the destination communication apparatus 101 and copies the difference of the execution object based on the determination result. However, since time is consumed for acquiring the difference, the efficiency may be improved when the entire data is copied without acquiring the difference if the communication speed between the communication apparatuses 101 is sufficiently fast. Therefore, the communication system 100 according to a third embodiment checks the communication state when migration information to be copied is set in the migration source process of the process migrating unit 404 in the second embodiment.

If the communication state is the wired connection state, the communication system 100 does not copy the program code 2406 and copies the entire data 2407 without acquiring the difference. If the communication state is the wireless connection state, the communication system 100 acquires and copies the difference of the data 2407. The operation of the process migrating unit 404 according to the third embodiment will be described with reference to FIG. 27. The hardware of the communication system 100 according to the third embodiment is equivalent to the hardware of the communication system 100 according to the second embodiment and the functions of the communication system 100 according to the third embodiment are substantially equivalent to the functions of the communication system 100 according to the second embodiment. A migration source process of the process migrating unit 404 having a function different from the second embodiment will hereinafter be described.

FIG. 27 is a flowchart of the migration source process of the process migrating unit 404 in the source communication apparatus 101#0 according to the third embodiment. In the description of the flowchart depicted in FIG. 27, as is the case with the flowchart depicted in FIG. 25, it is assumed that the source communication apparatus 101 and the destination communication apparatus 101 are the communication apparatus 101#0 and the communication apparatus 101#1, respectively. The operations at steps S2701 to S2704 and steps S2706 to S2710 depicted in FIG. 27 are equivalent to the processes of steps S2501 to S2504 and steps S2505 to S2509 and will not be described.

After the operation at step S2704, the CPU 102#0 determines whether the communication state is the wireless connection state (step S2705). If the communication state is the wireless connection state (step S2705: YES), the CPU 102#0 goes to the operation at step S2706. If the communication state is the wired connection state (step S2705: NO), the CPU 102#0 goes to the operation at step S2708.

As described above, according to the communication apparatus, the load distribution method, and the recording medium according to the third embodiment, if the wired connection state exists at the time of process migration, the difference of data is not generated and the data is directly transferred to the destination communication apparatus. This enables the communication system to utilize the high-speed, wired connection to save the time consumed for generating the difference and thereby, further enhances the processing efficiency.

The communication system 100 according to the first to third embodiments has been described on the premise of two communication states, i.e., the wired connection state and the wireless connection state. In FIG. 18, if the communication state is the wireless connection state, the load distribution based on thread is not considered because even when the flowcharts of FIGS. 19 and 20 are executed in the wireless connection state, the migration cost is considerably increased and no thread improves the load balance. Therefore, if three or more states exist that have different communication speeds, configuration may be such that the flowcharts of FIGS. 19 and 20 are not executed for a state with a low communication speed. Alternatively, configuration may be such that the flowcharts of FIGS. 19 and 20 are executed regardless of communication speed.

If the communication speed is changed to a slower speed, the communication system 100 returns a migrated thread to the source communication apparatus 101 and considers the load distribution again. If the communication speed is changed to a faster speed, the communication system 100 maintains the state of the migrated thread and considers the load distribution again.

The load distribution method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The communication apparatus, the load distribution method, and the recording medium can execute load distribution according to the communication state between communication apparatuses and effect improved processing efficiency of the communication apparatuses.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A first communication apparatus comprising:
a first central processing core; and
a first memory, wherein
the first communication apparatus executes load distribution based on a first load amount of the first communication apparatus and a second load amount of a second communication apparatus that includes a second central processing core and a second memory,
the first communication apparatus executes first load distribution when the first communication apparatus and the second communication apparatus perform wireless communication,
the first communication apparatus executes second load distribution when the first communication apparatus and the second communication apparatus perform wired communication.

2. The first communication apparatus according to claim 1, wherein
the first communication apparatus, in the first load distribution, causes program code and data of a process executed by the first central processing core to be transferred to the second memory.

3. The first communication apparatus according to claim 2, wherein
the first communication apparatus selects a process to be transferred to the second memory, based on a transfer time from the first memory to the second memory.

4. The first communication apparatus according to claim 1, wherein
the first communication apparatus, in the second load distribution, causes a thread included in a process executed by the first central processing core to be transferred to the second communication apparatus.

5. The first communication apparatus according to claim 4, wherein
the first communication apparatus selects a second thread to be transferred to the second communication apparatus, based on an access frequency of the second thread to the first memory or past transfer history of the second thread.

6. The first communication apparatus of according to claim 1, wherein
the first communication apparatus executes the load distribution when a difference between the first load amount and the second load amount is greater than or equal to a predetermined value.

7. The first communication apparatus according to claim 1, further comprising a timer, wherein
the first communication apparatus determines whether the load distribution is to be executed, based on notification from the timer.

8. A load distribution method of distributing load between a first communication apparatus and a second communication apparatus, and performed by a computer, the load distribution method comprising:
- executing, if the first communication apparatus and the second communication apparatus perform wireless communication, first load distribution of transferring between the first communication apparatus and the second communication apparatus, program code and data of a program executing a predetermined function, and
- executing, if the first communication apparatus and the second communication apparatus perform wired communication, second load distribution of transferring between the first communication apparatus and the second communication apparatus, a thread process included in the program.

9. The load distribution method according to claim 8, comprising
- executing the first load distribution or the second load distribution when a difference between a first load amount of the first communication apparatus and a second load amount of the second communication apparatus is greater than or equal to a predetermined value.

10. A non-transitory computer-readable recording medium accessed by a computer and storing a load distribution program causing the computer to execute a process comprising:
- detecting a communication state between a first communication apparatus and a second communication apparatus;
- detecting a first load amount of the first communication apparatus and a second load amount of the second communication apparatus; and
- determining to execute load distribution between the first communication apparatus and the second communication apparatus, based on the first load amount and the second load amount;
- transferring, when the communication state is wired communication and execution of load distribution is determined at the determining, a program executing a predetermined function, the program being transferred between the first communication apparatus and the second communication apparatus; and
- transferring, when the communication state is wireless communication and execution of load distribution is determined at the determining, a thread corresponding to a unit of processing by the program executing the predetermined function, the thread being transferred between the first communication apparatus and the second communication apparatus.

* * * * *